US006826028B2

(12) United States Patent
Schuellein

(10) Patent No.: US 6,826,028 B2
(45) Date of Patent: Nov. 30, 2004

(54) MULTI-PHASE BUCK CONVERTER WITH PROGRAMMABLE PHASE SELECTION

(75) Inventor: George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/761,526

(22) Filed: Jan. 20, 2004

(65) Prior Publication Data

US 2004/0145845 A1 Jul. 29, 2004

Related U.S. Application Data

(60) Provisional application No. 60/443,210, filed on Jan. 28, 2003.

(51) Int. Cl.[7] ................................ H02H 3/08
(52) U.S. Cl. ...................... 361/93.1; 361/93.8
(58) Field of Search ............... 361/93.8, 93.1, 361/18, 39.8

(56) References Cited

U.S. PATENT DOCUMENTS

| 6,166,528 A | * | 12/2000 | Rossetti et al. | ............. | 323/283 |
| 6,433,527 B1 | * | 8/2002 | Izadinia et al. | ............... | 361/85 |
| 6,674,274 B2 | | 1/2004 | Hobrecht et al. | ........... | 323/285 |
| 2004/0070906 A1 | * | 4/2004 | Kohout et al. | ................ | 361/92 |

* cited by examiner

Primary Examiner—Shawn Riley
(74) Attorney, Agent, or Firm—Ostrolenk, Faber, Gerb & Soffen, LLP

(57) ABSTRACT

A buck converter is provided for providing an output voltage to a load, the output voltage being produced from an input voltage in accordance with a desired voltage. The buck converter includes an output capacitor, the output voltage being provided by the output capacitor; a plurality of output switch arrangements having respective output inductors coupled to the output capacitor, the switch arrangements being controllable to provide respective phase output currents to the output capacitor through the respective output inductors; a plurality of phase output arrangements respectively coupled to the output switch arrangements, the phase output arrangements being controllable to set the respective phase output currents supplied by the output switch arrangements, each of the phase output arrangements being operable to shutdown the respective output switch arrangement if a signal representing an output current of the buck converter falls below a respective programmable threshold signal; and a phase control arrangement configured to control the phase output arrangements to set the respective phase output currents supplied by the output switch arrangements so that the output voltage approximates the desired voltage.

28 Claims, 27 Drawing Sheets

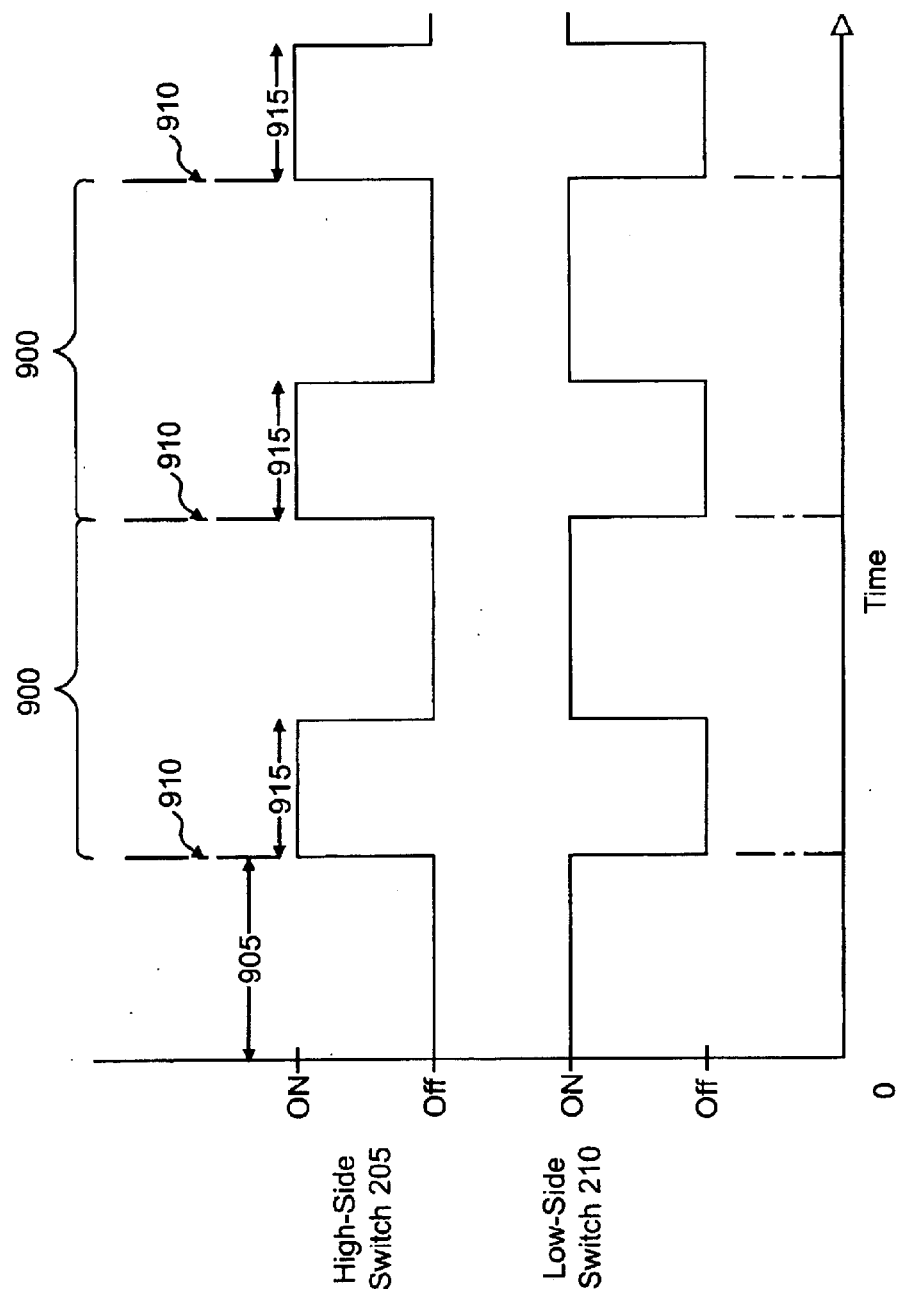

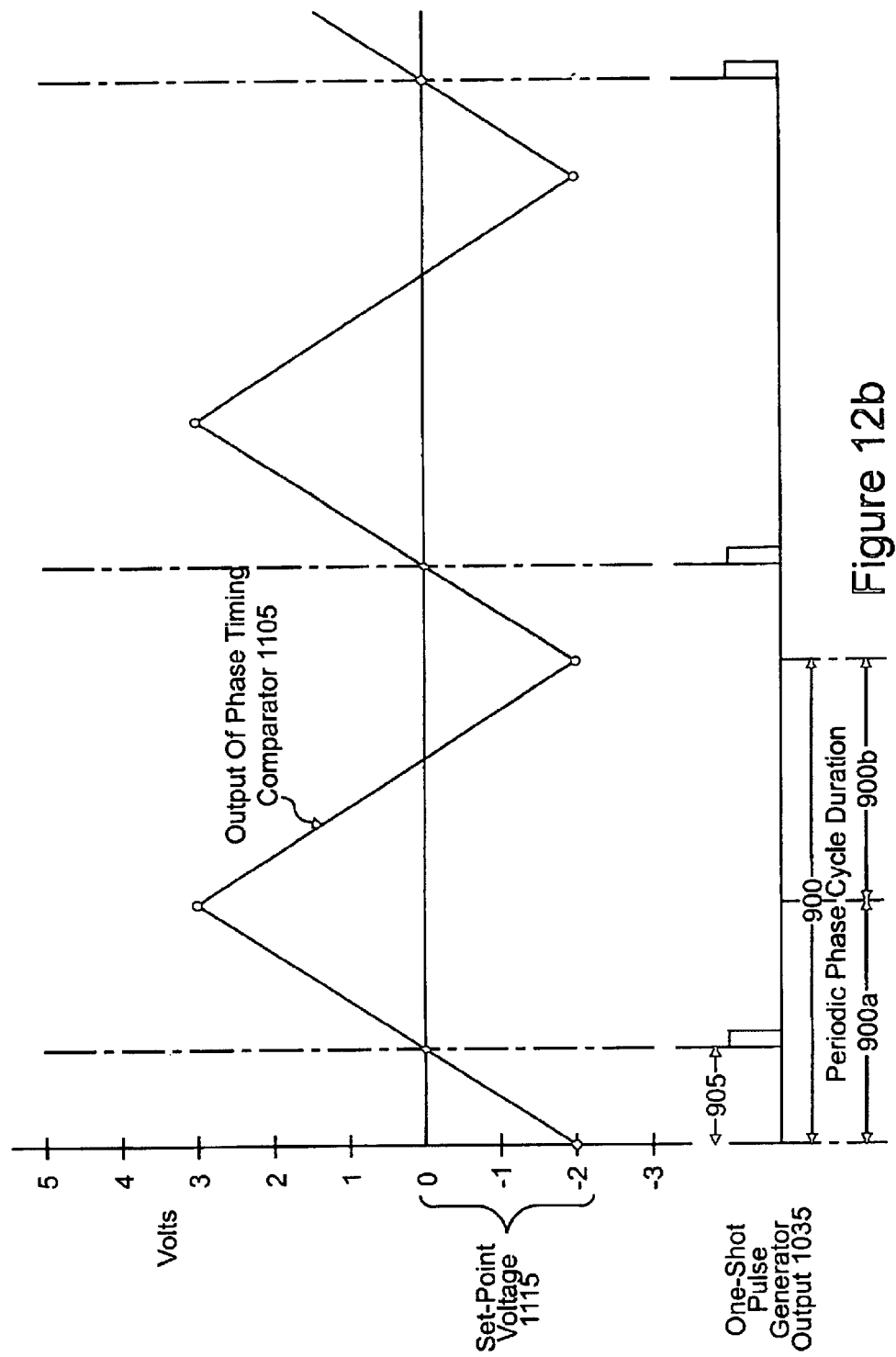

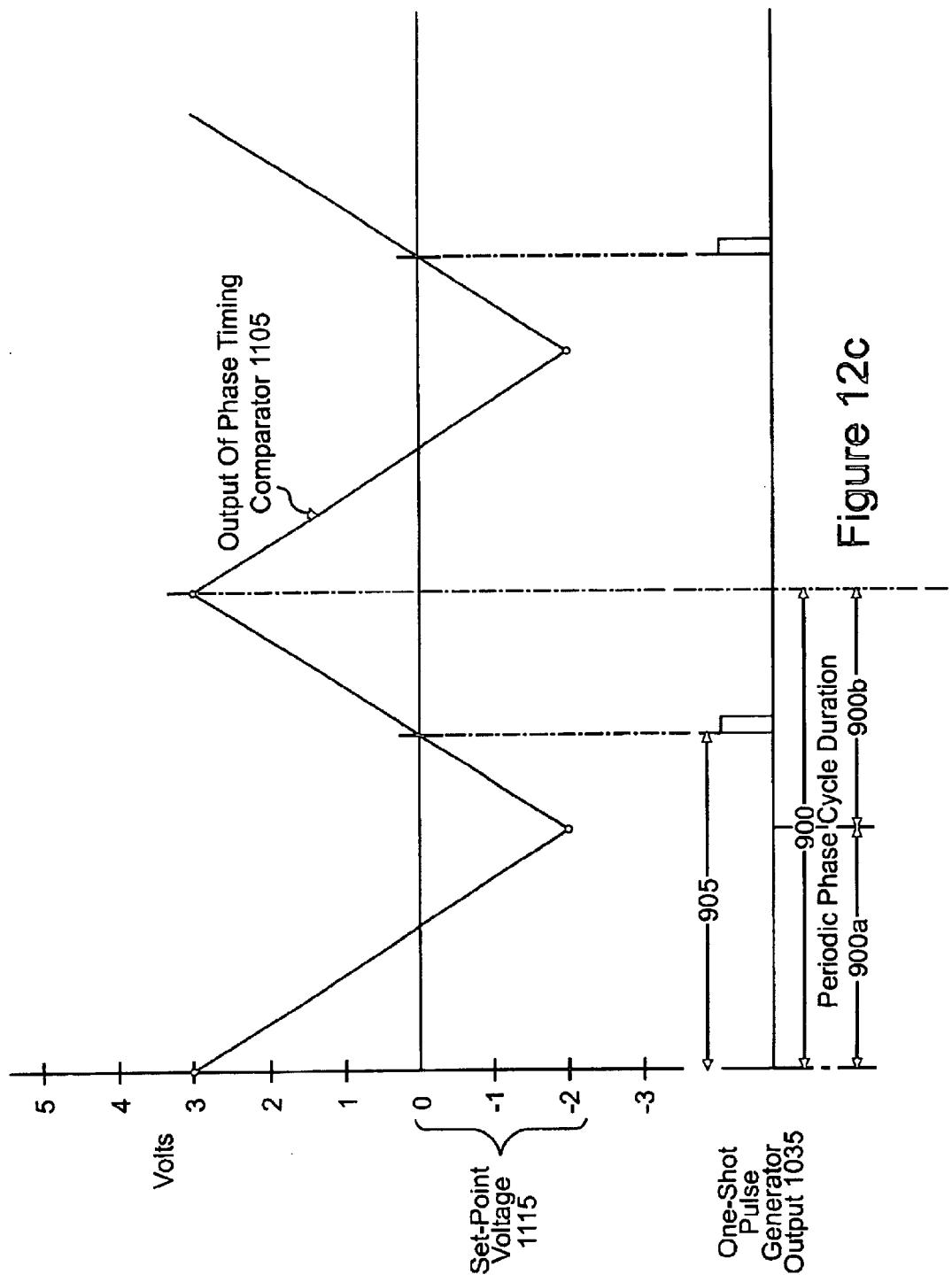

US 6,826,028 B2

MULTI-PHASE BUCK CONVERTER WITH PROGRAMMABLE PHASE SELECTION

RELATED APPLICATIONS

The present application is based on and claims the benefit of U.S. Provisional Application No. 60/443,210, filed on Jan. 28, 2003, entitled MULTIPHASE CONVERTER WITH PROGRAMMABLE PHASE SELECTION, the entire contents of which are expressly incorporated herein by reference.

FIELD OF THE INVENTION

The present invention relates to buck converters, such as multi-phase buck converters for use in low voltage/high-current applications.

BACKGROUND INFORMATION

Various applications may provide a conventional DC-to-DC buck converter that accepts a DC input voltage and produces a lower DC output voltage to drive at least one circuit component. Buck converters are typically used in low voltage applications requiring high amounts of load current (e.g., 30 amps or more). Typically, as shown in FIG. 19, a single phase buck converter 1900 includes a high-side switch 1905, a low-side switch 1910 connected to the high-side switch at a switch node 1915, an output inductor 1920 connected to the switch node 1915, and an output capacitor 1925 connected to the output inductor 1920.

In operation, the high-side and low-side switches 1905, 1910 are controlled by a control circuit 1930 to produce a desired output voltage across a load 1935. For this purpose, the high-side switch 1905 is initially switched on, while the low-side switch 1910 remains off. This causes a voltage drop across the output inductor 1920 of approximately ($V_{IN}$−$V_{OUT}$), which causes a current to build inside the output inductor 1920. At a subsequent time, the high-side switch 1905 is switched off, and the low-side switch 1910 is switched on. Since the current within the inductor 1920 cannot change instantly, sourced through switch 1910, the current continues to flow through the output inductor 1920, thereby charging the output capacitor 1925 and causing the voltage ($V_{OUT}$) across the output capacitor 1925 to rise.

In this manner, the high-side and the low-side switches 1905, 1910 may be suitably switched at appropriate times, until the voltage ($V_{OUT}$) across the output capacitor 1925 equals a desired output voltage, which is typically lower than the input voltage. Once the desired output voltage is reached, the high-side and the low-side switches 1905, 1910 may be periodically controlled so that the output inductor 1920 provides an amount of current equal to the current demand of a load 1935 connected across the output capacitor 1925. By providing no more and no less than the current demand of the load 1935, the voltage ($V_{OUT}$) across the output capacitor 1925 remains at least approximately constant at the desired output voltage.

It is also known to provide a multi-phase DC-to-DC buck converter 2000 including a plurality of interleaving output phases 2005a, 2005b, 2005c, . . . , 2005n, as shown in FIG. 20. As shown in FIG. 20, each of the output phases 2005a, 2005b, 2005c, . . . , 2005n is assigned a respective switching arrangement, including a high-side switch, a low-side switch, and an output inductor. In operation, the control circuit 2010 periodically operates the output phases 2005a, 2005b, 2005c, . . . , 2005n in a time-delayed sequence.

By operating the output phases 2005a, 2005b, 2005c, . . . , 2005n in a phase-delayed sequence, the conventional multi-phase buck converter 2000 distributes current production across the multiple output phases 2005a, 2005b, 2005c, . . . , 2005n, thereby distributing heat generation and reducing the requirements for the output capacitor 1925, such that a smaller output capacitor 125 may be utilized.

However, since conventional multi-phase buck converters require a fixed number of point-to-point connections between the control circuit 2010 and the output phases 2005a, 2005b, 2005c, . . . , 2005n, conventional multi-phase buck converters do not provide a robust architecture capable of easy expandability to include any number of desired phases.

Furthermore, conventional multi-phase buck converters do not optimally control the output voltage in response to a request for a lower desired output voltage or a decrease in current demand of the load 1935. By not optimally controlling the output voltage, conventional multi-phase buck converters may produce unwanted voltage spikes, which may damage circuitry connected to the output of the buck converter.

SUMMARY OF THE INVENTION

It is an object of the present invention to provide a multi-phase buck converter that overcomes the disadvantageous of prior art buck converters described above. To achieve this object, the present invention provides a multi-phase buck converter for producing an output voltage to a load, the output voltage being produced from an input voltage in accordance with a desired voltage, the converter including an output capacitor, the output voltage being provided by the output capacitor; a plurality of output switch arrangements having respective output inductors coupled to the output capacitor, the switch arrangements being controllable to provide respective phase output currents to the output capacitor through the respective output inductors; a plurality of phase output arrangements respectively coupled to the output switch arrangements, the phase output arrangements being controllable to set the respective phase output currents supplied by the output switch arrangements; a phase control bus communicatively coupled to each of the phase output arrangements; and a phase control arrangement communicatively coupled to the phase control bus, the phase control arrangement being configured to control the phase output arrangements to set the respective phase output currents supplied by the output switch arrangements so that the output voltage approximates or is regulated to the desired voltage, in which the phase control arrangement and the phase output arrangements are provided as respective integrated circuits, and the phase control arrangement is configured to control the phase output arrangements via the phase control bus.

By separating the functions of the phase control arrangement and the phase output arrangements, an exemplary multi-phase buck converter according to the present invention contains no unused or redundant silicon, since the buck converter may include only those number of phase output arrangements required for a particular application. Thus, if a design engineer requires, for example, a three-phase buck converter for a particular application, the engineer may design the multi-phase buck converter to include only three phase output arrangements, each of which is assigned to a respective one of the three phase outputs. Furthermore, the phase control bus (e.g., a 5-wire analog bus) permits the multi-phase buck converter of the present invention to communicate with a potentially unlimited number of phase output arrangements, without requiring point-to-point electrical connections between the phase control arrangement and each of the phase output arrangements. In this manner, the multi-phase buck converter permits an efficient and easily scalable phase architecture.

In accordance with another exemplary embodiment of the present invention, the multi-phase buck converter is provided with a phase error detect arrangement configured to produce a phase error signal if a phase output arrangement is incapable of providing a phase output current to match the average inductor current of the phase output arrangements. In this manner, the phase control arrangement is provided with a signal for detecting a defective phase and, if appropriate, may deactivate the defective phase and/or enable a back-up phase output arrangement.

In accordance with yet another exemplary embodiment of the present invention, each of the output phase arrangements operates to switch off both the high-side and low-side switches in response to a request for a lower desired output voltage ($V_{DES}$) or a decrease in current demand of the load. In this manner, the slew rate of the inductor is increased, which enhances the response time of the multi-phase buck converter of the present invention and prevents disadvantageous negative currents from flowing through the output inductor and possibly damaging the power supply.

In accordance with still another exemplary embodiment of the present invention, each of the output phase arrangements includes a current sense amplifier, a resistor $R_{CS}$ electrically connected between the positive input of the current sense amplifier and an output inductor node, and a capacitor $C_{CS}$ electrically connected between the positive and negative inputs of the current sense amplifier, with the output inductor also being connected to the negative input of the current sense amplifier.

By connecting resistor $R_{CS}$ and capacitor $C_{CS}$ across the nodes of the output inductor, the current flowing through the output inductor 220 may be sensed by selecting resistor $R_{CS}$ and capacitor $C_{CS}$ such that the time constant of resistor $R_{CS}$ and capacitor $C_{CS}$ equals the time constant of the output inductor 220 and its DC resistance (i.e., inductance L/inductor DCR, where DCR is the inductor DC resistance), the voltage across capacitor. In this manner, this embodiment of the present invention permits each of the output phase arrangements to sense the current provided to the load in a lossless manner (i.e., without interfering with the current provided to the load).

In accordance with yet another exemplary embodiment of the present invention, the phase control arrangement includes droop circuitry configured to reduce the output voltage in proportion to the current demand of the load. In this manner, this exemplary embodiment permits an efficient and simple method to adaptively modify the output voltage via adaptive voltage positioning.

In accordance with yet another exemplary embodiment of the present invention, each of the phase output arrangements of the multi-phase buck converter is programable to shutdown the high-side and low-side switches of its respectively assigned output switch arrangement as a function of the output current of the multi-phase buck converter. In this regard, the number of phase output arrangements chosen for a particular design may depend upon the need to meet thermal requirements and/or to minimize the number of input and output capacitors at maximum output current. However, at times when the output current of the buck converter is less than the maximum output current, efficiency will increase if less phase output arrangements are employed. Turning off phase output arrangements as the output current decreases, increases efficiency by eliminating the gate charging loses, MOSFET switching losses, and circulating currents in high-side and low-side switches, and the output inductors of each phase output arrangement. Each unique circuit design should turn off phase output arrangements in sequence at particular output current levels to achieve the maximum efficiency over the entire output current range.

BRIEF DESCRIPTION OF THE DRAWINGS

FIG. 9a is a graph showing an exemplary periodic charge cycle duration for an output switch arrangement.

FIG. 12b is a graph showing the phase timing signal of FIG. 12 offset by a set-point voltage value.

FIG. 12c is a graph showing the output of a phase time comparator.

DETAILED DESCRIPTION

Figure 1:
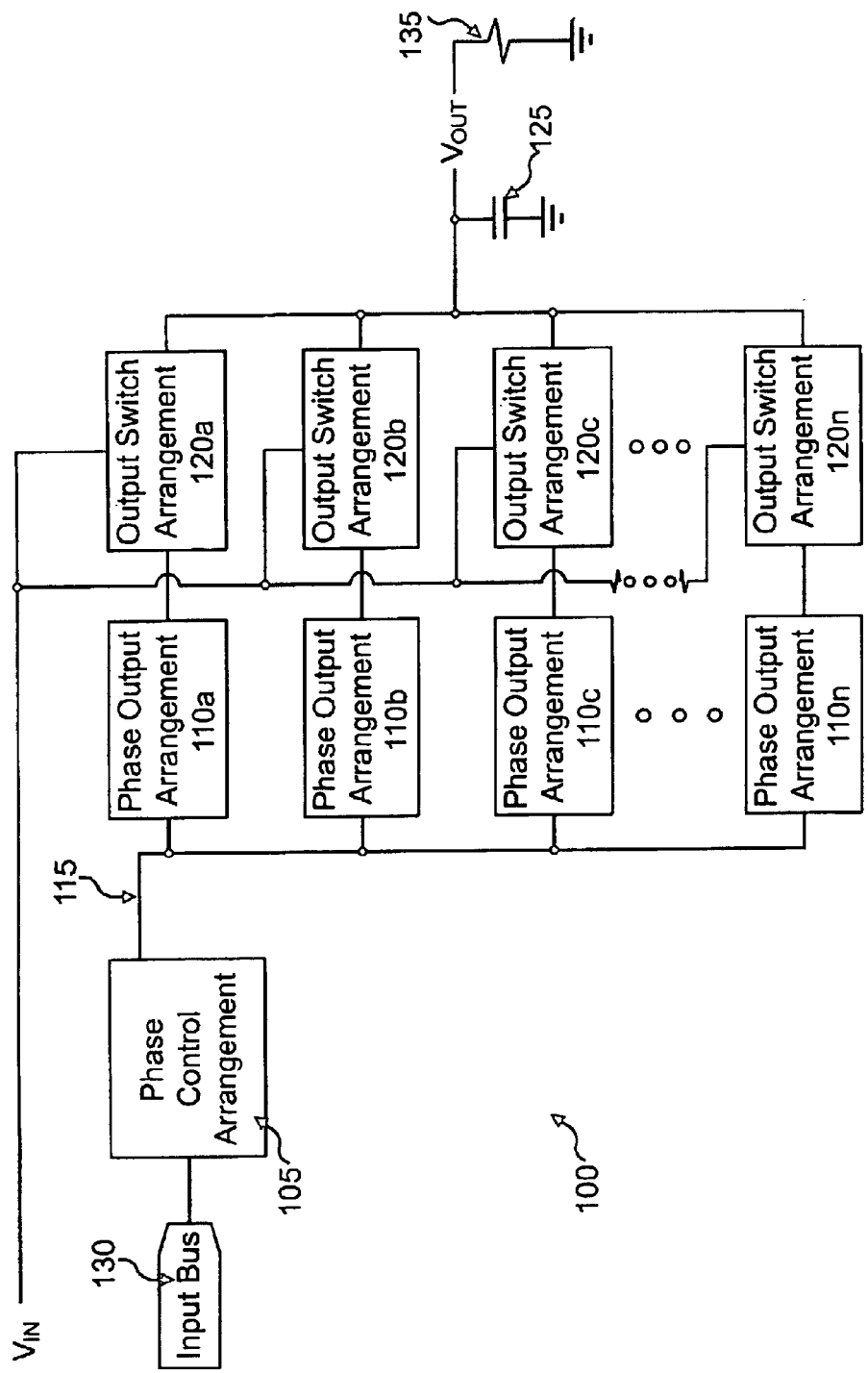
FIG. 1 is a block diagram of an exemplary buck converter according to the present invention.

Referring now to FIG. 1, there is seen a first exemplary multi-phase buck converter 100 according to the present invention. Buck converter 100 includes phase control arrangement 105 electrically and communicatively coupled to input bus 130, phase output arrangements 110a, 110b, 110c, ..., 110n electrically and communicatively coupled to the phase control arrangement 105 via a phase control bus 115 (e.g., a 5-wire analog bus), output switch arrangements 120a, 120b, 120c, ..., 120n electrically and communicatively coupled to an input voltage ($V_{IN}$) and phase output arrangements 110a, 110b, 110c, ..., 110n, an output capacitor 125 electrically coupled to the output switch arrangements 120a, 120b, 120c, ..., 120n for producing an output voltage ($V_{OUT}$), and a load 135 electrically connected between the output voltage ($V_{OUT}$) and ground.

The exemplary multi-phase buck converter 100 of FIG. 1 may be used, for example, in applications requiring small sizes, design flexibility, various low voltage outputs, high currents and fast transient responses, and the buck converter 100 may include one or more output phases, for example, three phases, each of which may be implemented by a respective one of the phase output arrangements 110a, 110b, 110c, ..., 110n.

The control arrangement 105 includes circuitry configured to control the phase output arrangements 110a, 110b, 110c, ..., 110n by communicating phase control signals via the phase control bus 115, so that the phase output arrangements 110a, 110b, 110c, ..., 110n produce the output voltage ($V_{OUT}$) in accordance with a desired output voltage variable ($V_{DES}$), which may be provided to the control arrangement 105 via input bus 130.

Each of the phase output arrangements 110a, 110b, 110c, ..., 110n includes circuitry configured to control respective output switch arrangements 120a, 120b, 120c, ..., 120n in response to the phase control signals communicated by the control arrangement 105 via the phase control bus 115. For this purpose, the phase output arrangements 110a, 110b, 110c, ..., 110n operate to control the respective switch arrangements 120a, 120b, 120c, ..., 120n to produce the output voltage ($V_{OUT}$) in accordance with the desired output voltage variable ($V_{DES}$).

Figure 2:
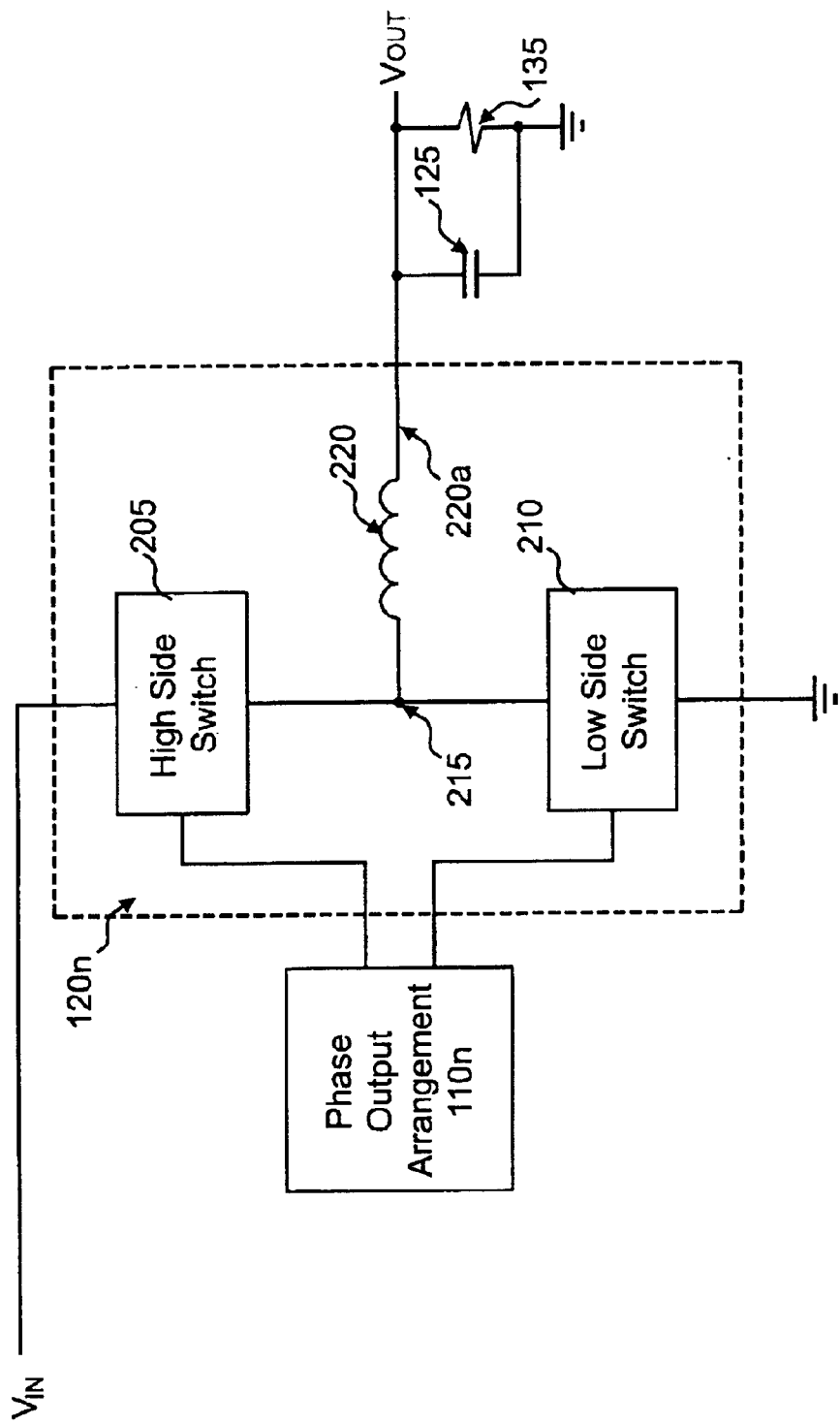
FIG. 2 is a block diagram of an output switch arrangement according to the present invention.

Referring now to FIG. 2, there is seen an exemplary output switch arrangement 120n according to the present invention. Output switch arrangement 120n includes a high-side switch 205 and a low-side switch 210 (e.g., transistor switches, FET switches, FET rectifier, etc) electrically connected to one another via an inductor node 215. The input voltage ($V_{IN}$) is electrically connected to the high-side switch 205 and a ground voltage is electrically connected to the low-side switch 210. The output voltage ($V_{OUT}$) is produced at an output-node side 220a of an output inductor 220, which is also electrically connected to the switch node 215.

In operation, the high-side and low-side switches 205, 210 of switch arrangement 120n are controlled by the phase output arrangement 110n to produce the desired output voltage ($V_{OUT}$) at the output-node side 220a of the output inductor 220. For this purpose, the high-side switch 205 is initially switched on, while the low-side switch 210 remains off. This causes a voltage drop across the output inductor 220 of approximately ($V_{IN}$–$V_{OUT}$), which causes a current to build inside the output inductor 220. At a subsequent time, the high-side switch 205 is switched off, and the low-side switch 210 is switched on. Since the current within the inductor 220 cannot change instantly, the current continues to flow through the output inductor 220, thereby charging the output capacitor 125 and causing the voltage drop across the output capacitor 125 to rise.

In this manner, the high-side and the low-side switches 205, 210 may be suitably switched controlled at appropriate times, until the voltage drop across the output capacitor 125 equals the desired output voltage ($V_{DES}$). Once the desired output voltage ($V_{DES}$) is reached, the high-side and the low-side switches 205, 210 may be periodically controlled so that the output inductor 220 provides an amount of current equal to the current demand of the load 135 connected across the output capacitor 125. By providing no more and no less than the current demand of the load 135, the voltage drop ($V_{OUT}$) across the output capacitor 125 remains approximately constant at the desired output voltage ($V_{DES}$).

In accordance with the exemplary embodiment of the present invention described above, the output phase arrangement 110n controls the high-side and low-side switches 205, 210 during a periodic charge cycle duration, which may be characterized by an assigned phase delay, a periodic start time, and a charge-on duration. Referring now to FIG. 9a, there is seen an exemplary periodic charge cycle duration 900 for the output switch arrangement 120n, including an assigned phase delay 905, a periodic start time 910, and a charge-on duration 915. As shown in FIG. 9a, the high-side switch 205 is switched on at the periodic start time 910, remains on during the charge-on duration 915, and is switched off at the end of the charge-on duration 915. After the charge-on duration 915 expires, the high-side switch remains off for the remainder of the periodic charge cycle duration 900. During normal operation, the low-side switch 210 is controlled such that the low-side switch 210 is switched on when the high-side switch is switched off, and vice versa. In this manner, the output inductor 220 builds up current during the charge-on duration 915 and releases at least a portion of the current after the charge-on duration 915 during the remainder of the periodic charge cycle duration 900.

By controlling the high-side and low-side switches 205, 210 in the manner described above, the amount of current built up in the output inductor 220 may be controlled by changing the charge-on duration 915 relative to the periodic charge cycle duration 900. For example, if the charge-on duration 915 is equal to half the periodic charge cycle duration 900 (i.e., 50% duty cycle), the switch arrangement 120n will provide the output capacitor 125 with half the maximum current of the buck converter 100. Or, for example, if the charge-on duration 915 is equal to the periodic charge cycle duration 900 (i.e., 100% duty cycle), the switch arrangement 120n will provide the output capacitor 125 with the maximum current of the buck converter 100.

During normal operation, the low-side switch 210 is controlled in dichotomy with the high-side switch 205. That is, when the high-side switch 205 is switch on, the low-side switch 210 is switched off, and vice versa. In this manner, one of the high-side and low-side switches 205, 210 is on at all times. However, in response to certain operating conditions, it may be desirous to switch off both switches 205, 210.

Therefore, in accordance with another exemplary embodiment of the present invention, the output phase arrangement 110*n* operates to switch off both the high-side and low-side switches 205, 210 in response to the occurrence of either of two unique operating conditions: a request for a lower desired output voltage ($V_{DES}$) or a decrease in current demand of the load 135 drop (i.e., a load-step decrease).

A request for a lower desired output voltage ($V_{DES}$) may cause negative inductor currents to flow through the output inductor 220. Negative currents transform the buck converter 100 into a boost converter by transferring energy from the output capacitor 125 to the input voltage ($V_{IN}$). This energy may damage the power supply (not shown) and/or other components, may cause the voltage control loop to become unstable, and may result in wasted energy.

Figure 9B:
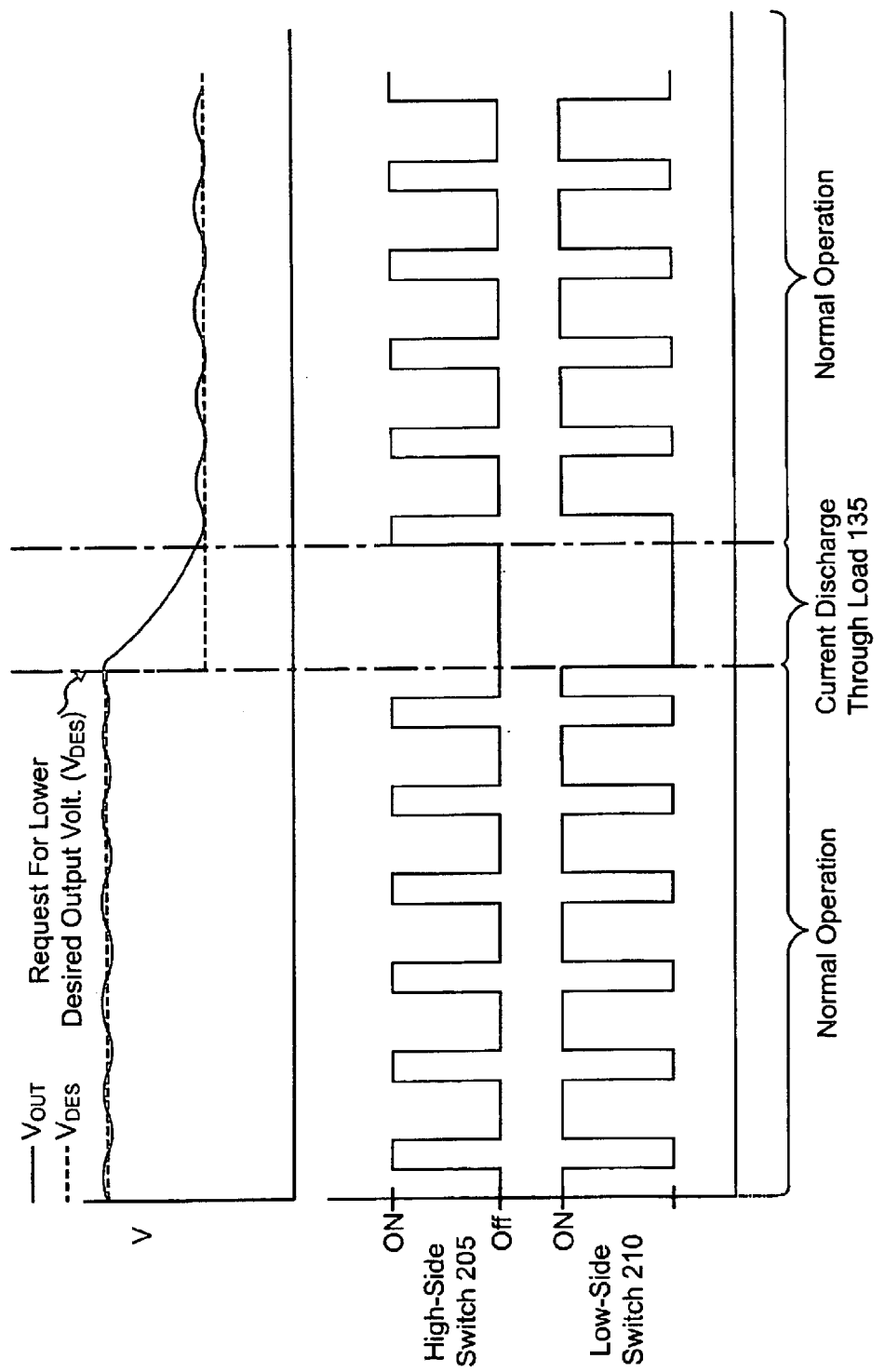
FIG. 9b is a graph showing an output switch arrangement control in response to a request for a lower desired output voltage.

As shown in FIG. 9*b*, to prevent the creation of negative inductor currents, both the high-side and low-side switches 205, 210 are turned off in response to a request for a lower desired output voltage ($V_{DES}$). In this manner, the current built up in the output inductor 220 is discharged through the load 135, rather than through the power supply.

As the current discharges through the load 135, the output voltage ($V_{OUT}$) across the output capacitor 125 drops. Once the output voltage ($V_{OUT}$) drops to approximately the lower desired output voltage ($V_{DES}$), negative currents are no longer a concern, and the high-side and low-side switches 205, 210 may be operated in normal fashion.

When the current demands of the load 135 drop (i.e., a load-step decrease), the high-side and low-side switches 205, 210 should be controlled to reduce the current supplied to the output capacitor 125 by the output inductor 220. However, in conventional buck converters, the minimum time required to reduce the current (i.e., a current transient) in the output inductor 220 in response to a load-step decrease is governed by the following equation:

$$T_{SLEW}=[L\times(I_{MAX}-I_{MIN})]/V_{OUT}, \quad (1)$$

where the high-side and low-side switches 205, 210 are implemented as FET rectifiers.

Thus, when the current demands of the load decrease, the current transient (i.e., the current built up inside the output inductor at the time of a load-step decrease) of the output inductor 220 of conventional buck converters will cause the output capacitor 125 voltage to rise. Although the current demand of the load 135 will eventually drain the excess charge of the output capacitor 125, the short-time duration voltage-spike on the output voltage ($V_{OUT}$) may damage sensitive circuitry connected to the buck converter 100.

However, in accordance with an exemplary embodiment of the present invention, the output phase arrangement 110*n* operates to switch off both the high-side and low-side switches 205, 210 (i.e., body-brake) in response to a decrease in current demand of the load 135 drop (i.e., a load-step decrease). In this manner, the slew rate (i.e., the rate at which current may be reduced) of the output inductor 220 may be significantly increased, where the high-side and low-side switches 205, 210 are implemented as FET rectifiers. By turning off both the high-side and low-side switches 205, 210, the switch node voltage is forced to decrease until the body diode of the FET rectifier conducts. This increases the voltage across the inductor from $V_{OUT}$ to $V_{OUT}$+the voltage across the body diode (i.e., $V_{BODY\ DIODE}$). Thus, the slew rate of the output inductor 220 is reduced in accordance with the following equation:

$$T_{SLEW}=[L\times(I_{MAX}-I_{MIN})]/(V_{OUT}+V_{BODY\ DIODE}) \quad (2)$$

Figure 4:
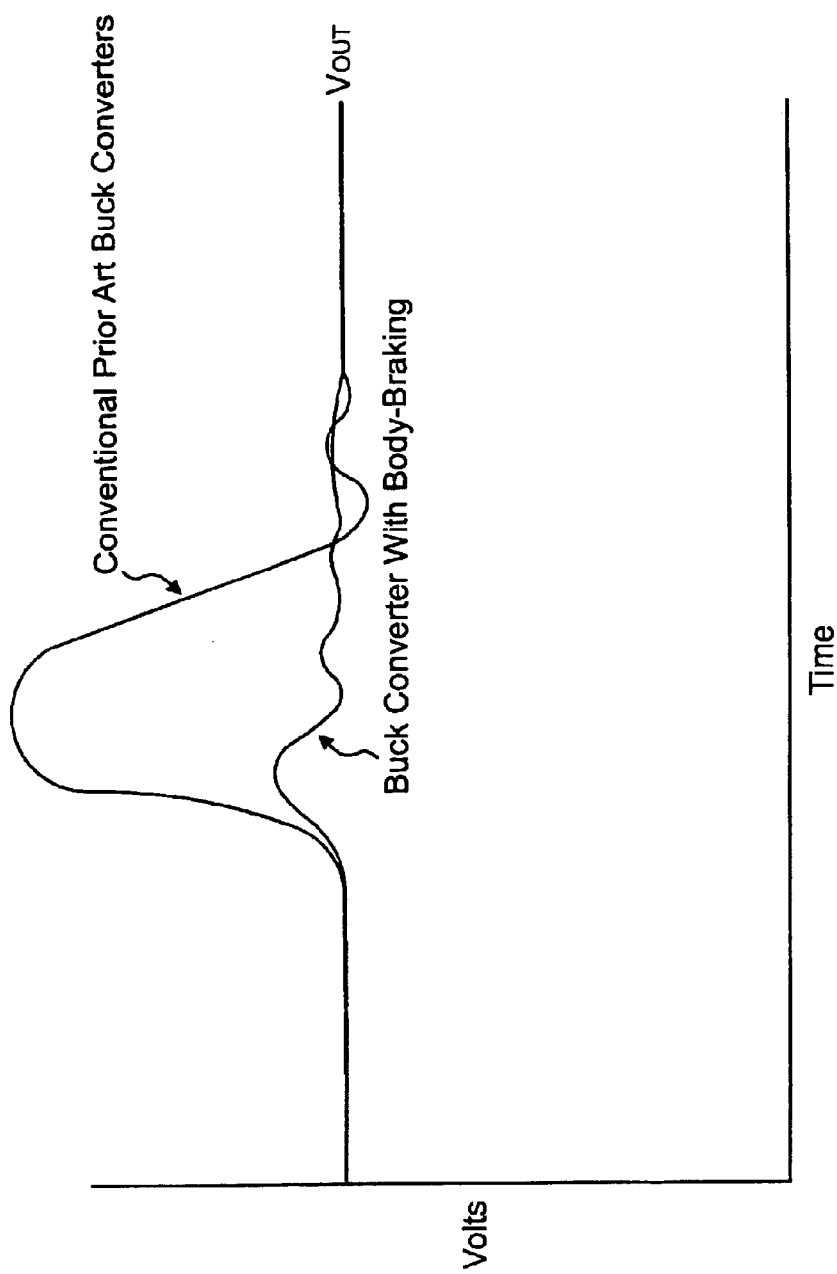
FIG. 4 is a graph showing the response of an exemplary buck converter according to the present invention in response to a load-step decrease.

Therefore, in accordance with this exemplary embodiment of the present invention, the current transient built up inside the output inductor 220 during a load-step decrease condition may be drained off more rapidly, thereby causing a much less pronounced voltage spike, when compared to the prior art, as shown in FIG. 4. In fact, since the voltage drop across the body diode may be higher than the output voltage $V_{OUT}$, the inductor current slew rate may be increased by two times or more.

Figure 10:
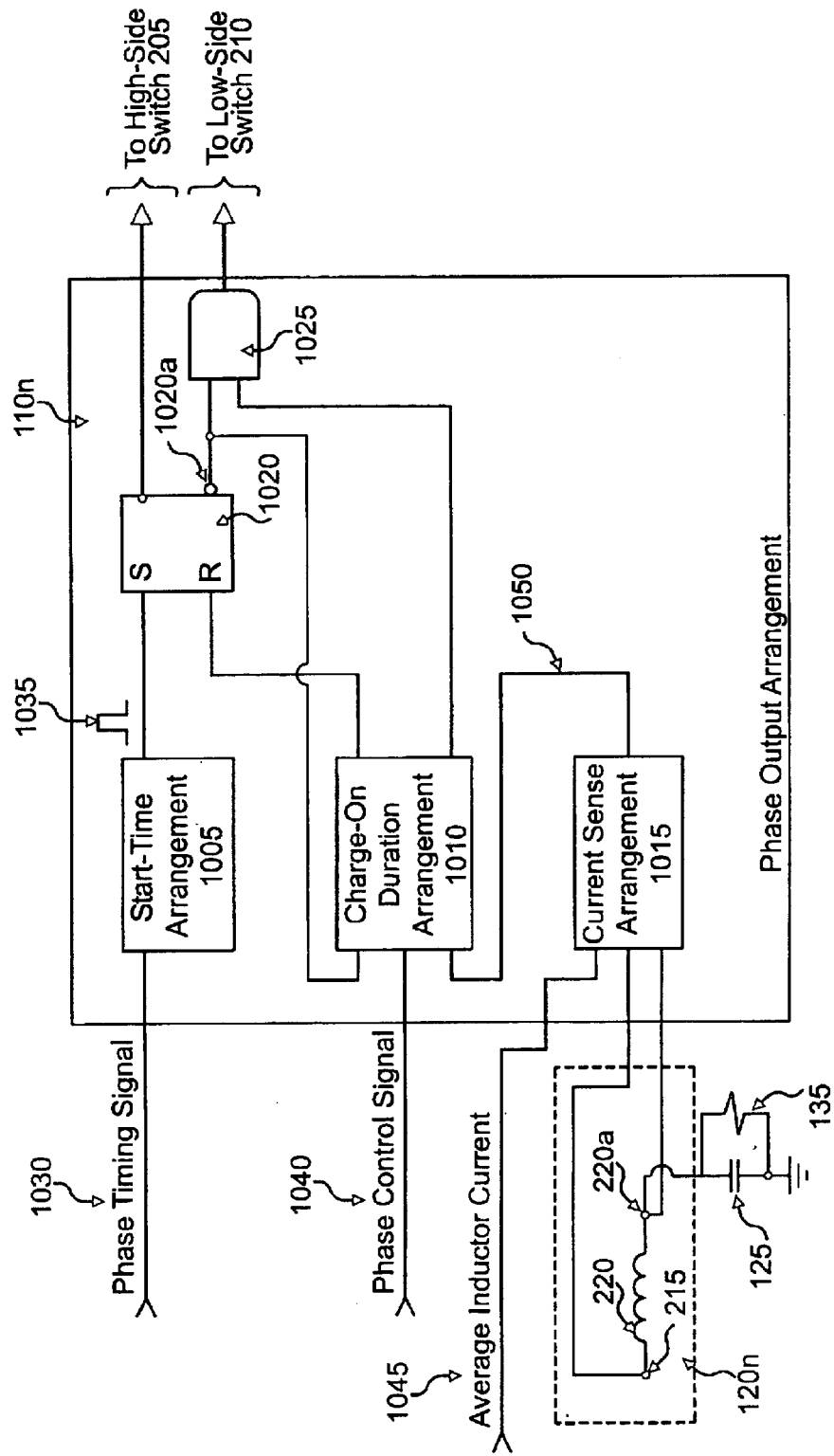
FIG. 10 is a block diagram of an exemplary phase output arrangement according to the present invention.

Referring now to FIG. 10, there is seen an exemplary phase output arrangement 110*n* according to the present invention for controlling the high-side and low-side switches 105, 110 of the output switch arrangement 120*n* in the manner described above. Phase output arrangement 110*n* includes a start-time arrangement 1005, a charge-on duration arrangement 1010, a current sense arrangement 1015 electrically coupled to the charge-on duration arrangement 1010, an S-R latch 1020 electrically coupled to the start-time arrangement 1005 and the charge-on duration arrangement 1010, and an and-gate 1025 electrically coupled to the S-R latch 1020 and the charge-on duration arrangement 1010.

The start-time arrangement 1005 includes circuitry configured to determine the periodic start time 910 and the phase delay 905 shown in FIG. 9*a*. For this purpose, the start-time arrangement 1005 receives a phase timing signal 1030 from the phase control arrangement 105. The phase timing signal 1030 may include, for example, a periodic analog signal having a period equal to the periodic charge cycle duration 900 (e.g., a periodic saw-tooth waveform, a periodic sinusoidal waveform, a periodic triangular waveform, etc). Using the periodic analog signal 1030, the start-time arrangement 1005 may determine the periodic start time 910 and the phase delay 905, and generate a periodic clock pulse 1035 at the periodic start time 910. The clock pulse 1035 sets the S-R latch 1020, causing the high-side switch 205 to switch on and the low-side switch 210 to switch off at the beginning of the charge-on duration 915.

The charge-on duration arrangement 1010 includes circuitry configured to determine the charge-on duration 915, to reset the S-R latch 1020 at the end of the charge-on duration 915, and to switch of both the high-side and low-side switches 205, 210 in response to a request for a lower desired output voltage ($V_{DES}$) or a decrease in current demand of the load 135 drop (i.e., a load-step decrease). For this purpose, the charge-on duration arrangement 1010 receives a Pulse-Width-Modulation (PWM) control signal 1040 from the phase control arrangement 105. The PWM control signal 1040 may include, for example, an analog signal having a value proportional to the difference between the desired output voltage ($V_{DES}$) and the actual output voltage ($V_{OUT}$). Using the PWM control signal 1040, the charge-on duration arrangement 1010 appropriately determines the charge-on duration 915 for the high-side and low-side switches 205, 210. Furthermore, the charge-on duration arrangement 1010 is configured to modify the charge-on duration 915 in accordance with the amount of current supplied to the output capacitor 125 by the output inductor 220. For this purpose, the charge-on duration arrangement 1010 receives a current difference signal 1050 from the current-sense arrangement 1015 characterizing the amount of current supplied by the output inductor 220 relative to the average current 1045 provided by all the output switch arrangements 120*a*, 120*b*, 120*c*, ..., 120*n*, so that the charge-on duration arrangement 1010 may increase the charge-on duration 915 if the amount of current supplied by the output inductor 220 is less than the average current 1045 provided by all the output switch arrangements 120*a*, 120*b*, 120*c*, ..., 120*n*. By increasing the charge-on duration 915, the output inductor 220 supplies more current to the output capacitor 125. After the charge-on duration 915 expires, the charge-on duration arrangement 1010 resets the S-R latch 1020, which causes the high-side switch 205 to switch off and the low-side switch 210 to switch on for the remainder of the periodic charge cycle duration 900.

In response to a request for a lower desired output voltage ($V_{DES}$) or a decrease in current demand of the load 135 drop (i.e., a load-step decrease), which may be determined from the PWM control signal 1040 communicated by the phase control arrangement 105, the charge-on duration arrangement 1010 operates to turn off both the high-side and low-side switches 205, 210. For this purpose, the charge-on duration arrangement 1010 resets the S-R latch 1020 and transmits a logical "0" to the and-gate 1025, thereby causing both the high-side and low-side switches 205, 210 to switch off.

The S-R latch 1020 is reset dominant allowing all phase output arrangements 110*a*, 110*b*, 110*c*, ..., 110*n* to go to zero duty cycle within a few tens of nanoseconds. Phases may overlap and go to 100% duty cycle in response to a load step increase with the turn-on gated by clock pulses. In this manner, this method of controlling the phase output arrangements 110*a*, 110*b*, 110*c* ..., 110*n* provides a "single cycle transient response," in which the output inductor 220 current changes in response to load transients within a single switching cycle, thereby maximizing the effectiveness of the power train and minimizing the requirements of the output capacitor 125.

The current sense arrangement 1015 includes circuitry configured to generate the current difference signal 1050 for modifying the charge-on duration 915 in accordance with the current flowing through the output inductor 220 relative to the average current 1045 provided by all the output switch arrangements 120*a*, 120*b*, 120*c*, ..., 120*n*.

Figure 11:
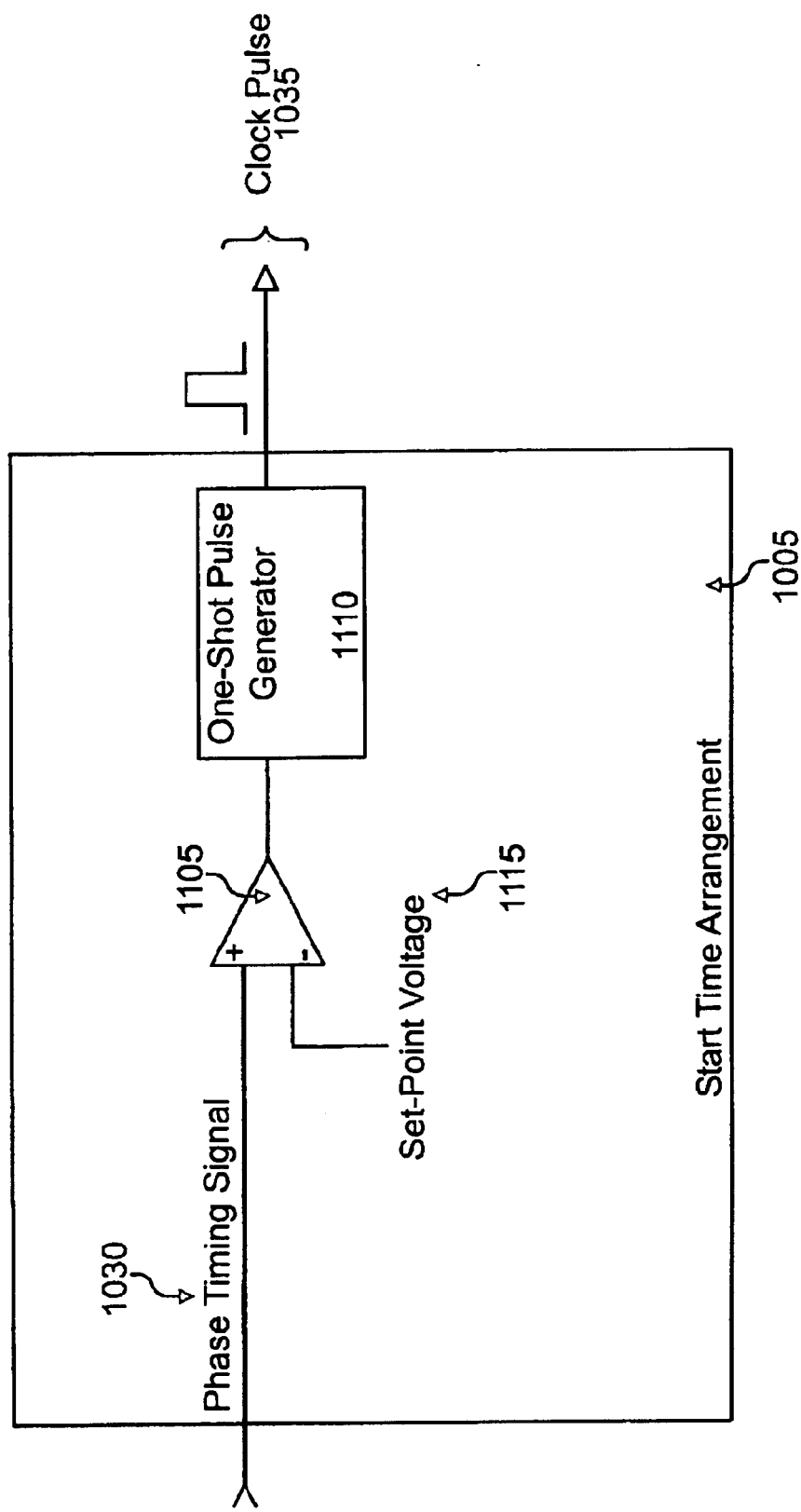
FIG. 11 is a block diagram of an exemplary start-time arrangement according to the present invention.
Figure 12A:
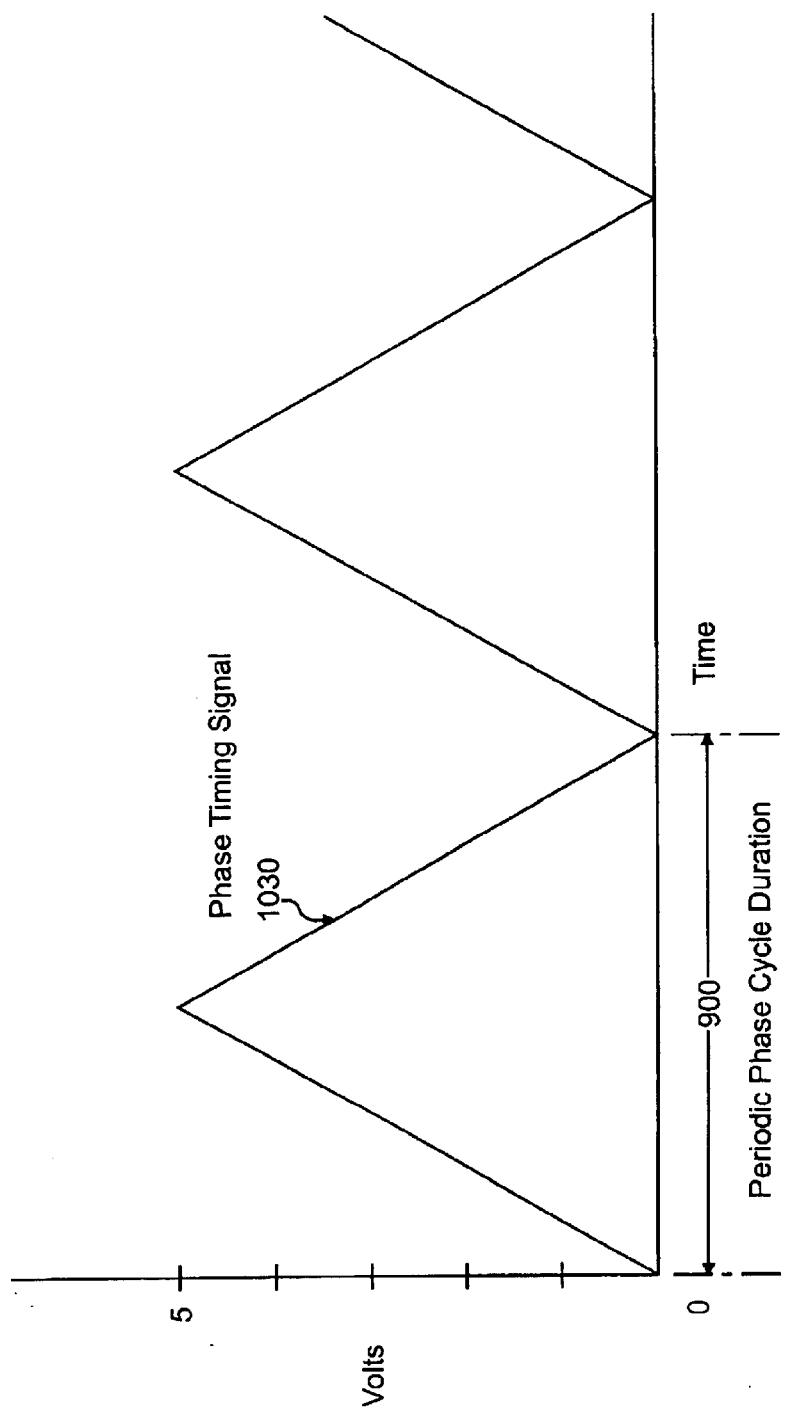
FIG. 12a is a graph showing an exemplary phase timing signal according to the present invention.

Referring now to FIG. 11, there is seen an exemplary start-time arrangement 1005 according to the present invention for generating the clock pulse 1035 in accordance with the periodic start time 910 and the phase delay 905. Start-time arrangement 1005 includes a phase timing comparator 1105 and a one-shot pulse generator 1110 electrically connected to the output of the phase timing comparator 1105. In this exemplary embodiment, the phase timing signal 1030 is a periodic triangular waveform 1030 having a period equal to the periodic charge cycle duration 900 and an amplitude varying between 0 volts and 5 volts, as shown in FIG. 12*a*.

Referring now to FIG. 12*b*, there is seen a timing diagram showing the outputs of the phase timing comparator 1105 and the one-shot pulse generator 1110. As shown in FIG. 12*b*, the output of the phase timing comparator 1105 is equal to the phase timing signal 1030 offset by a constant set-point voltage 1115. Thus, the output of the phase timing comparator 1105 crosses the zero-voltage axis once in the positive direction during the periodic charge cycle duration 900 at a time equal to the phase delay 905, thereby causing the one-shot pulse generator 1110 to generate the clock pulse 1035.

By appropriately selecting the set-point voltage 1115 between 0 and 5 volts, the one-shot pulse generator 1110 may be controlled to generate the clock pulse 1035 at any time during the first half 900*a* of the periodic phase cycle duration 900. To cause the one-shot pulse generator 1110 to generate the clock pulse 1035 during the second half 900*b* of the periodic phase cycle duration 900, the inputs to the phase timing comparator 1105 may be switched, such that the phase timing signal is provided to the negative input of the phase timing comparator 1105 and the set-point voltage 1115 is provided to the positive input of the phase timing comparator 1105. In this manner, the outputs of the phase timing comparator 1105 and the one-shot pulse generator 1110 resemble those shown in the timing diagram of FIG. 12*c*.

Thus, in accordance with the present invention, each of the phase output arrangements 110*a*, 110*b*, 110*c*, ..., 110*n* may be assigned a unique phase delay 905 and periodic start time 910 during the periodic phase cycle duration 900, without requiring separate point-to-point electrical connections between the phase control arrangement 105 and the phase output arrangements 110*a*, 110*b*, 110*c*, ..., 110*n*. Furthermore, if the phase output arrangements 110*a*, 110*b*, 110*c*, ..., 110*n* are to be implemented using separate phase integrated circuits, an especially efficient and simple assignment of the phase delay 905 and periodic start time 910 for each of the phase output arrangements 110*a*, 110*b*, 110*c*, ..., 110*n* may be effected if both inputs of the phase timing comparator 1105 are electrically connected to input pins of a respective phase integrated circuit.

Figure 12D:
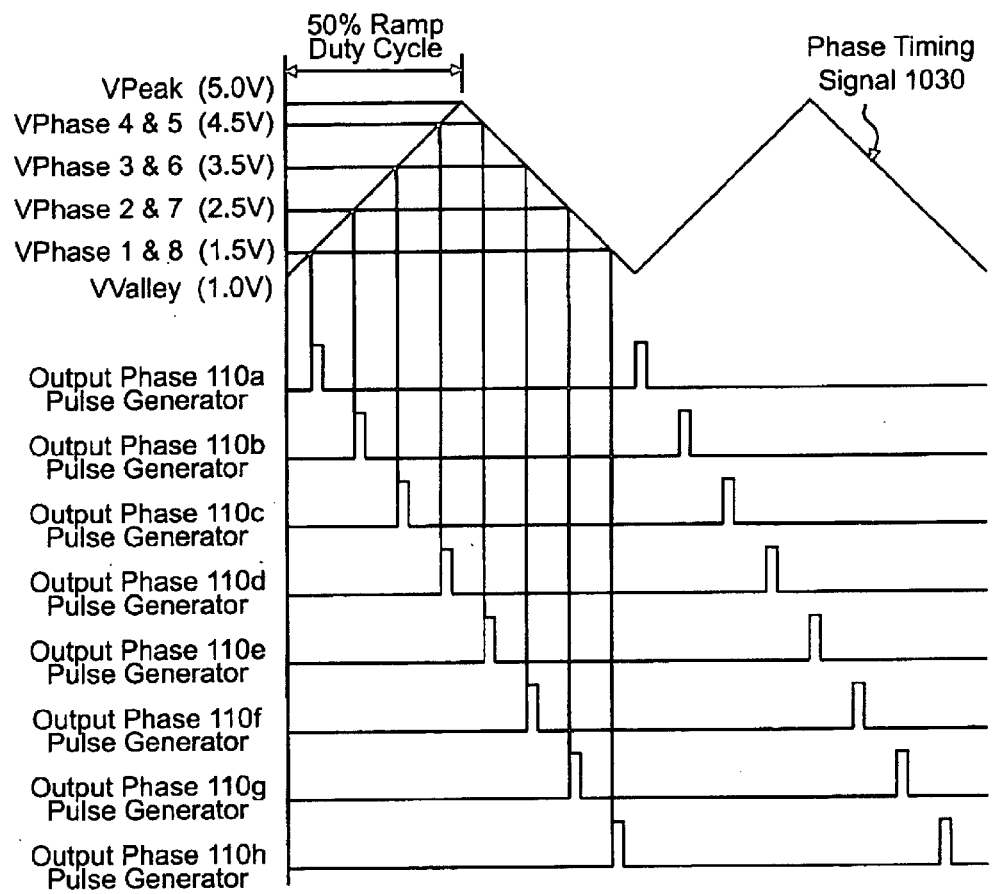
FIG. 12d is a graph showing phase timing for eight phases with respect to a triangular phase timing signal.

Referring now to FIG. 12*d*, there is seen a time diagram showing the outputs of respective one-shot pulse generators for an exemplary buck converter 100 according to the present invention having eight phase output arrangements 110*a*, 110*b*, 110*c*, ..., 110*h*.

Figure 12E:
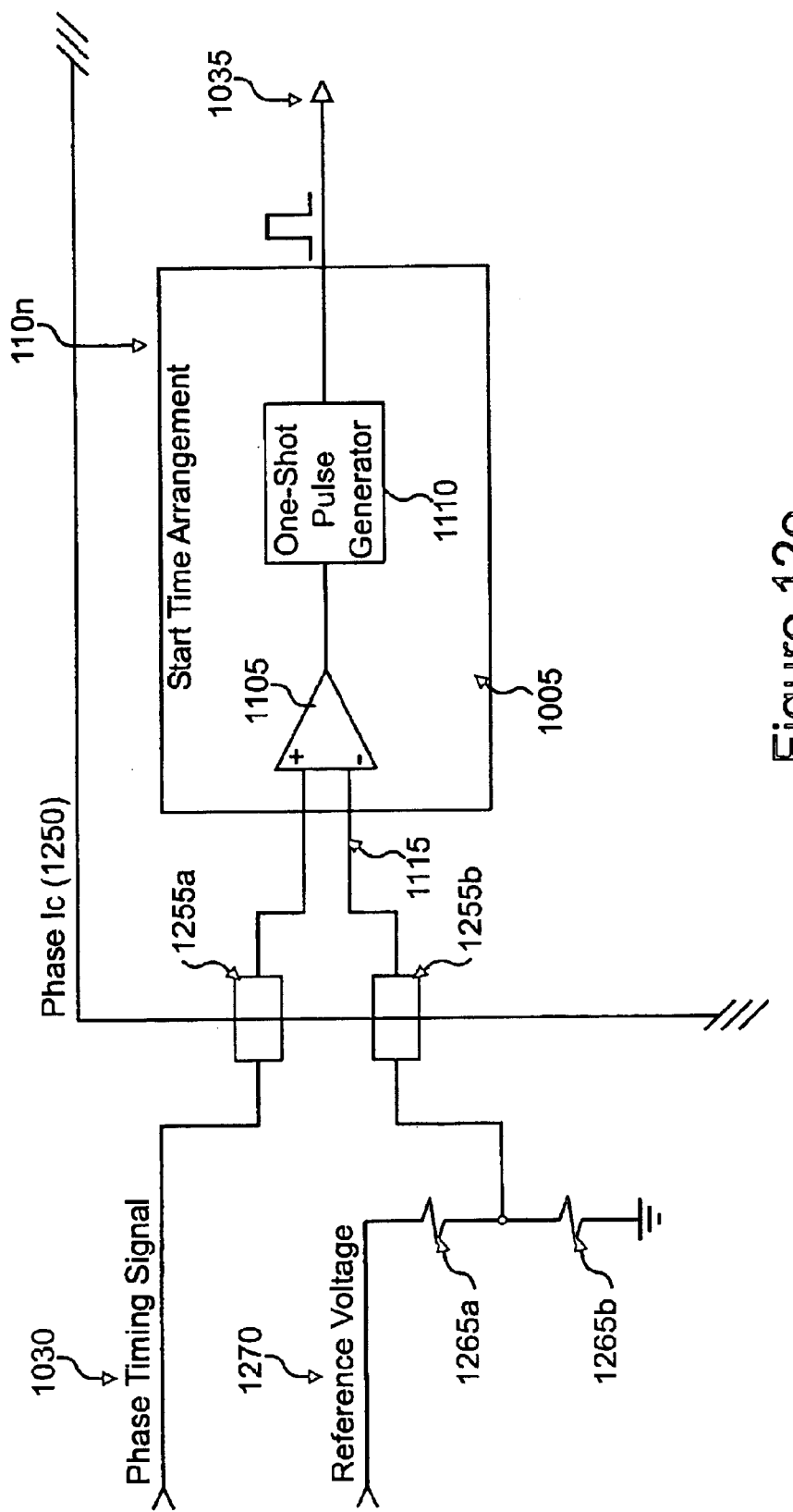
FIG. 12e is a block diagram showing another exemplary start-time arrangement according to the present invention.

Referring now to FIG. 12*e*, there is seen the start-time arrangement 1005 of an exemplary phase output arrangement 110*n* implemented as a separate and distinct phase IC 1250. As shown in FIG. 12*e*, the phase IC includes electrical contact pins 1255*a* and 1255*b* electrically connected to the inputs of the phase timing comparator 1105, respectively. A voltage divider is provided between a reference voltage 1270 and ground, the voltage divider comprising resistors 1265*a* and 1265*b* connected to one another at node 1260. By suitably selecting resistors 1265*a* and 1265*b*, a predetermined set-point voltage 1115 may be provided to the phase timing comparator 1105 via electrical contact pin 1255*b*.

Figure 13:
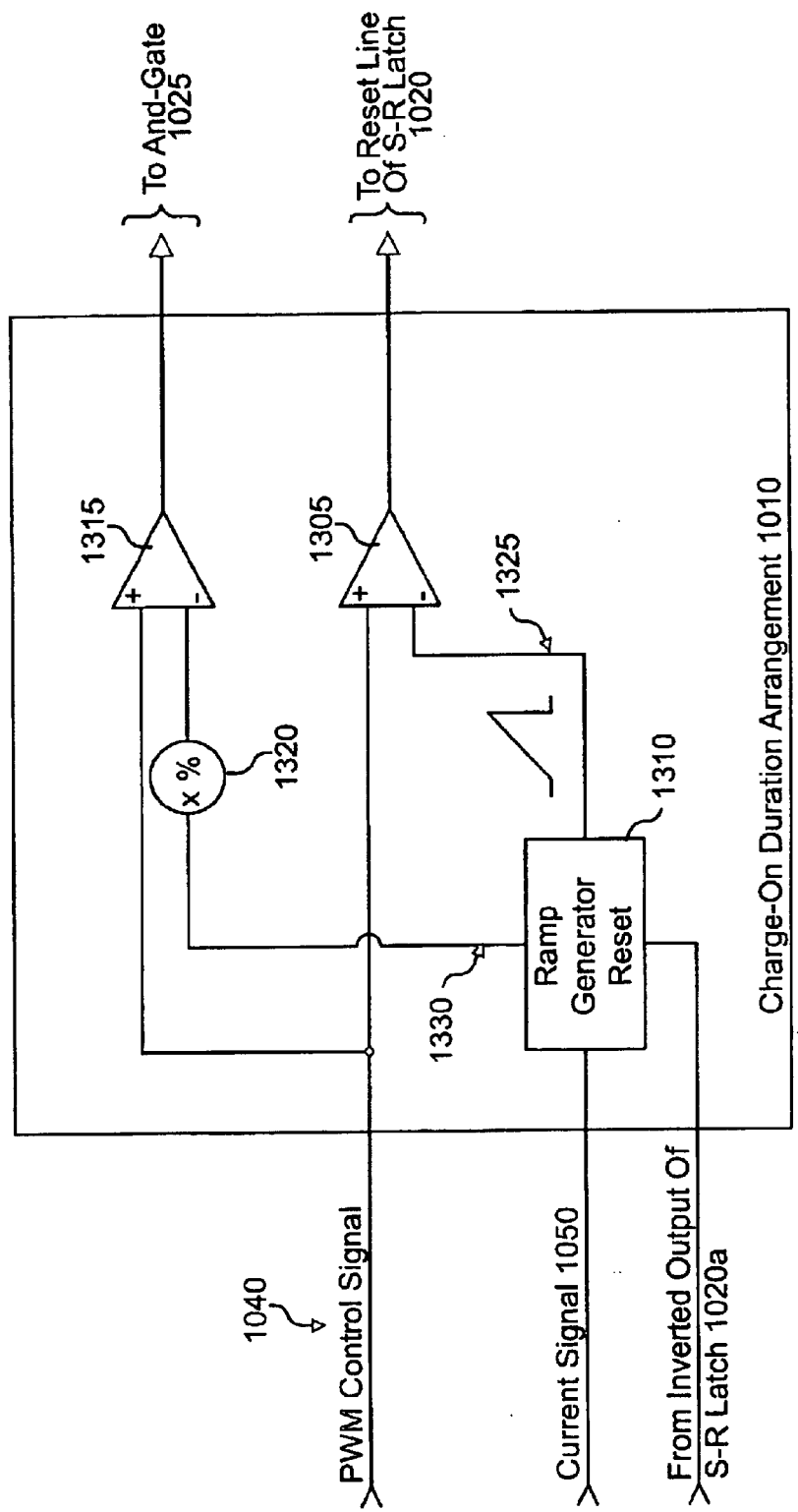
FIG. 13 is a block diagram showing an exemplary charge-on duration arrangement according to the present invention.

Referring now to FIG. 13, there is seen an exemplary charge-on duration arrangement 1010 according to the present invention. Charge-on duration arrangement 1010 includes charge-on duration amplifier 1305, body-brake detect amplifier 1315, a fractional multiplier 1320 electrically connected to the negative input of the body-brake detect amplifier 1315, and a ramp generator 1310 electrically coupled to the negative input of the charge-on duration amplifier 1305 and to the fractional multiplier 1320.

At a time before the start-time arrangement 1005 produces clock pulse 1035 to set the S-R latch 1020, the inverted output 1020*a* of the S-R latch 1020 asserts a logical high level "1" on the reset line of the ramp generator 1310 of the charge-on duration arrangement 1010. This causes the ramp generator 1310 to generate a constant default output voltage on ramp output line 1325 (the constant default voltage is also permanently provided on default voltage output line 1330). After the the start-time arrangement 1005 sets the S-R latch 1020, the high-side switch 205 is switched on and the inverted output 1020*a* of the S-R latch 1020 asserts a logical low level "0" on the reset line of the ramp generator 1310, causing the voltage on the ramp output line 1325 to ramp up from the default output voltage. The charge-on duration amplifier 1305 compares the ramp output line 1325 to the PWM control signal 1040, which, in this exemplary embodiment of the present invention, is an analog voltage signal proportional to the difference between the desired output voltage ($V_{DES}$) and the actual output voltage ($V_{OUT}$) ($V_{DES}-V_{OUT}$). Once the voltage at the ramp output line 1325 reaches the PWM control signal 1040 voltage level, the charge-on duration amplifier 1305 causes the S-R latch 1020 to reset, which causes the high-side switch 205 to switch off and causes the inverted output 1020a of the S-R latch 1020 to assert a logical high level "1" on the reset line of the ramp generator 1310 to reset the ramp output line 1325 to the default voltage.

In this manner, the charge-on duration 915 represents the time between when the start-time arrangement 1005 produces the clock pulse 1035 and when the ramp output line 1325 of the ramp generator 1310 equals the PWM control signal 1040 voltage level. Thus, the greater the deviation between the actual output voltage ($V_{OUT}$) and the desired output voltage ($V_{DES}$), the greater the PWM control signal 1040 voltage level, and thus the greater the charge-on duration 915.

Furthermore, the charge-on duration arrangement 1010 may modify the charge-on duration 915 in accordance with the amount of current supplied to the output capacitor 125 by the output inductor 220. For this purpose, the ramp generator 1310 receives a current difference signal 1050 from the current-sense arrangement 1015 that characterizes the amount of current supplied by the output inductor 220 relative to the average current 1045 provided by all the output switch arrangements 120a, 120b, 120c, . . . , 120n. For example, the current difference signal 1050 may provide a voltage value in proportion to the difference between the current supplied by the output inductor and the average current supplied by all the output switch arrangements 120a, 120b, 120c, . . . , 120n. Using the current difference signal 1050, the ramp generator 1310 may vary the rate at which the voltage at the output line 1325 ramps up, so that the rate at which the voltage at the ramp output line 1325 ramps up decreases as the difference between the current supplied by the output inductor and the average current supplied by all the output switch arrangements 120a, 120b, 120c, . . . , 120n increases.

Thus, if the amount of current supplied by the output inductor 220 is less than the average current 1045 provided by all the output switch arrangements 120a, 120b, 120c, . . . , 120n, the reduced ramp-up rate of the voltage at the ramp output line 1325 will cause the charge-on duration 915 to increase, thereby causing the output inductor 220 to supply more current to the output capacitor 125.

The charge-on duration arrangement 1010 is also configured to switch off both the high-side and low-side switches 205, 210 in response to a request for a lower desired output voltage ($V_{DES}$) or a decrease in current demand of the load 135 drop (i.e., a load-step decrease). For this purpose, the fractional multiplier 1320 produces a fractional multiple (e.g., 90%) of the default voltage of the ramp generator 1310, and provides the fractional multiple to the body-brake detect amplifier 1315. The body-brake detect amplifier 1315 compares the fractional multiple of the default voltage with the PWM control signal 1040 voltage level (i.e., a voltage level in proportion to $V_{DES}-V_{OUT}$) and generates a signal to switch off the high-side and low-side switches 205, 210 if the PWM control signal 1040 voltage level drops below the fractional multiple of the default voltage.

It should be appreciated that various conditions may cause the body-brake detect amplifier 1315 to switch off the high-side and low-side switches 205, 210. For example, a sudden decrease in current demand of the load 135, which would cause $V_{OUT}$ to rise in relation to $V_{DES}$, may cause the PWM control signal 1040 voltage level to drop below the fractional multiple of the default voltage. Alternatively, for example, the phase control arrangement 105 may force the PWM control signal 1040 below the fractional multiple of the default voltage in response to a request for a decrease in the desired output voltage ($V_{DES}$), as more fully described below.

Figure 14:
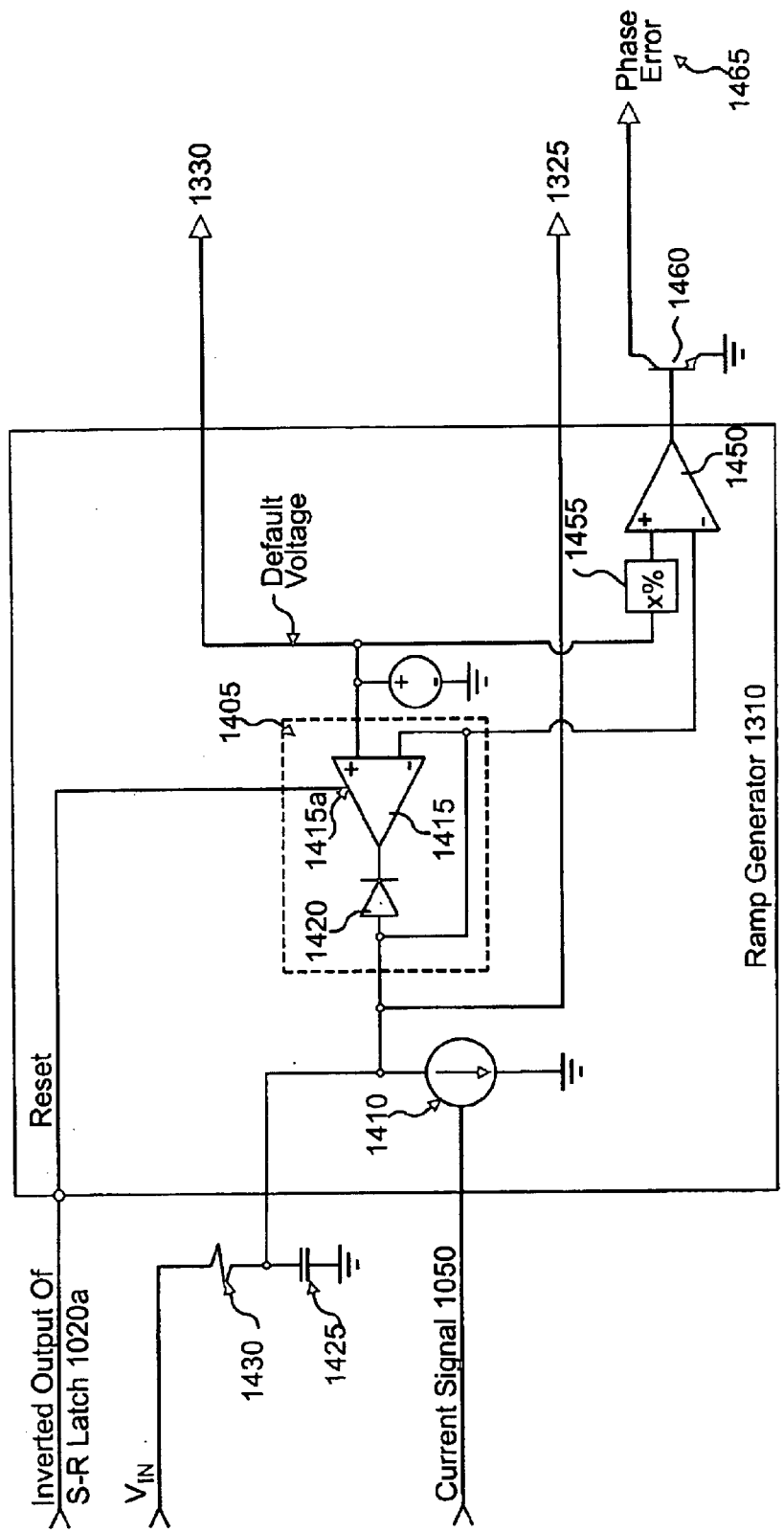
FIG. 14 is a block diagram showing an exemplary ramp generator according to the present invention.

Referring now to FIG. 14, there is seen an exemplary ramp generator 1310 according to the present invention. Ramp generator 1310 includes a clamp circuit 1405 and a programmable current source 1410 electrically connected to the ramp output line 1325. The clamp circuit 1405 includes an operational amplifier 1415 and a clamp diode 1420, both of which operate together to force the ramp output line 1325 to the default voltage when the enable input 1415a of the operational amplifier 1415 is asserted.

Ramp generator 1310 also includes an phase error detect amplifier 1450, a fractional multiplier 1455 electrically connected to the phase error detect amplifier 1450 and the default voltage, and a switch 1460 electrically connected to the output of the phase error detect amplifier 1450, all of which work together to generate a phase error signal 1465 if the phase output arrangement 120n is not capable of providing enough current to match the average current 1045 provided by the output switch arrangements 120a, 120b, 120c, . . . , 120n. Using the phase error signal 1465, the buck converter 100 may deactivate the damaged phase output arrangement 120n and/or activate a backup phase output arrangement 120n.

At a time before the start-time arrangement 1005 produces clock pulse 1035 to set the S-R latch 1020, the inverted output 1020a of the S-R latch 1020 asserts a logical high level "1" on the reset line of the ramp generator 1310, which enables the clamp circuit 1405, thereby clamping the voltage at the ramp output line 1325 to the default voltage. After the start-time arrangement 1005 sets the S-R latch 1020, the high-side switch 205 is switched on and the inverted output 1020a of the S-R latch 1020 asserts a logical low level "0" on the reset line of the ramp generator 1310, which disables the clamp circuit 1405. With the clamp circuit 1405 disabled, the ramp capacitor 1425 receives current from $V_{IN}$ through the ramp resistor 1430, thereby causing the voltage at the ramp output line 1325 of the ramp generator 1310 to ramp up. Once the voltage at the ramp output line 1325 reaches the PWM control signal 1040 voltage level, the charge-on duration amplifier 1305 causes the S-R latch 1020 to reset, which causes the high-side switch 205 to switch off and the inverted output 1020a of the S-R latch. 1020 to assert a logical high level "1" on the reset line of the ramp generator 1310, thereby causing the clamp circuit 1405 to clamp the output line 1325 to the default voltage.

The ramp-up time of the voltage on the ramp output line 1325 of the ramp generator 1310 may be modified in accordance with the amount of current the output inductor 220 supplies to the output capacitor 125 by controlling the programmable current source 1410 with the current difference signal 1050 generated by the current sense arrangement 1015. For this purpose, the current source 1410 may be controlled to sink an amount of current from the ramp output line 1325 proportional to the difference between the current supplied by the output inductor 220 and the average current supplied by all the output switch arrangements 120a, 120b, 120c, . . . , 120n. By removing (i.e., sinking) current from the ramp output line 1325, the ramp capacitor 1425 charges more slowly, thereby causing the voltage at the ramp output line 1325 to ramp up at a slower rate.

By charging the ramp capacitor 1425 from $V_{IN}$ through the ramp resistor 1430, the ramp-up rate of the voltage at the ramp output line 1325 will automatically compensate for changes in the input voltage $V_{IN}$, which may occur, for example, due to variations in the output voltage of the power supply (not shown) or due to voltage drops in the printed circuit board (PCB) related to changes in load current.

Furthermore, in accordance with another exemplary embodiment of the present invention, the desired output voltage ($V_{DES}$) is used as the default voltage of the ramp generator 1310. Since the desired output voltage ($V_{DES}$) is a relatively stable voltage level produced from a D/A converter inside the phase control arrangement 105, the desired output voltage ($V_{DES}$) does not fluctuate between different phase output arrangements 110a, 110b, 110c, ..., 110n. In this manner, differences in ground or input voltages at the phase output arrangements 110a, 110b, 110c, ..., 110n have little or no effect on the ramp voltage output of the ramp generator 1310, since the voltage of the output line 1325 is referenced to the desired output voltage ($V_{DES}$).

If the phase output arrangement 120n is damaged or otherwise inoperative, the current supplied by the output inductor 220 may drop to a level at which the current source 1410 sinks current at a faster rate than the ramp capacitor 1425 charges. In this case, the ramp output signal 1325 may begin to ramp downwards in voltage, causing the phase error detect amplifier 1450 to trigger the switch 1460 and produce a phase error signal, which may be used to deactivate the damaged phase output arrangement 120n and/or activate a backup phase output arrangement 120n.

Figure 15:
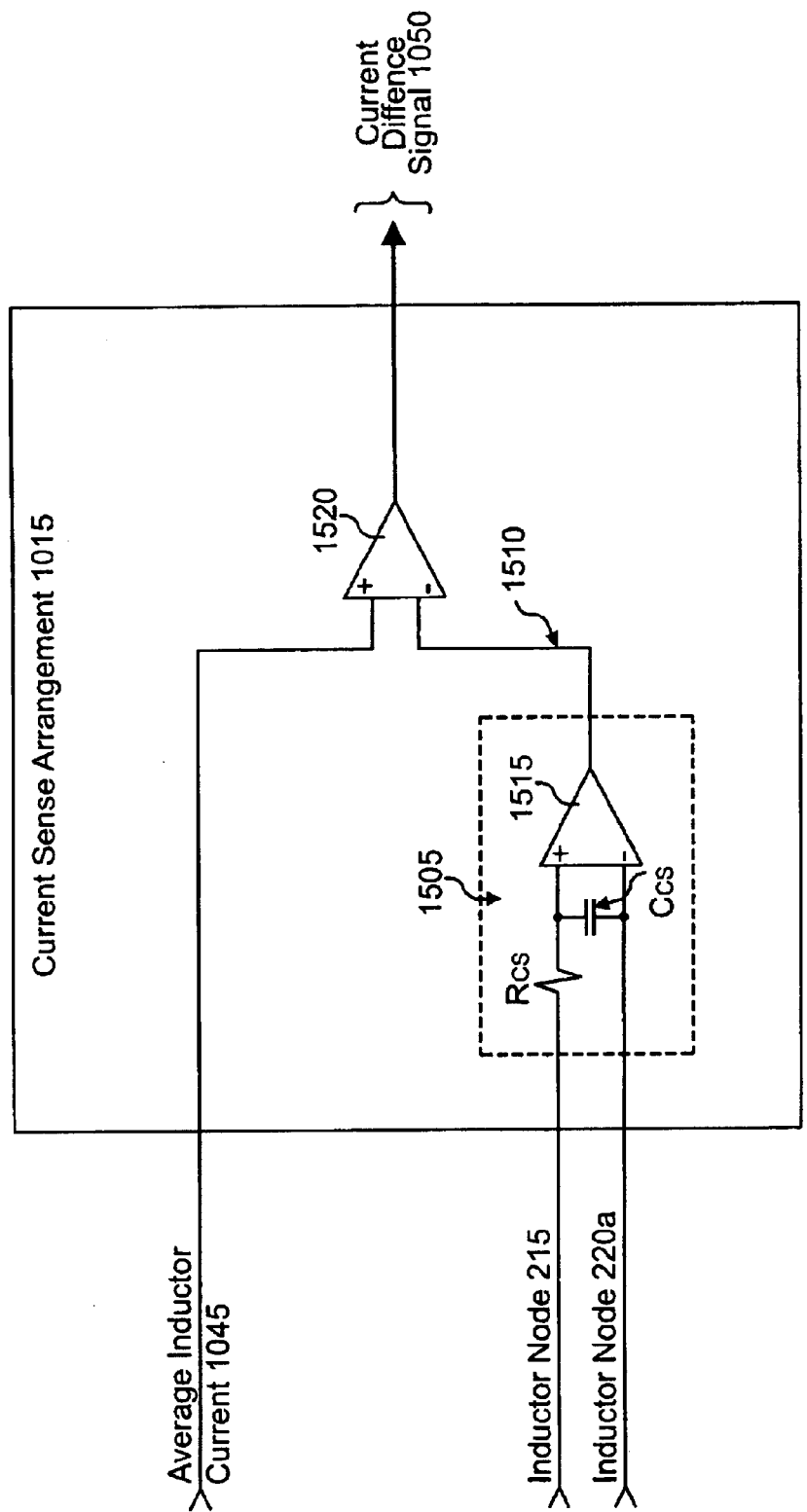
FIG. 15 is a block diagram showing an exemplary current sense arrangement according to the present invention.

Referring now to FIG. 15, there is seen an exemplary current sense arrangement 1015 according to the present invention. The current sense arrangement 1015 includes circuitry configured to generate a current difference signal 1050 characterizing the difference between the current supplied by the output inductor 220 and the average current supplied by all the output switch arrangements 120a, 120b, 120c, ..., 120n. For this purpose, he current sense arrangement 1015 includes an inductor current detection arrangement 1505 configured to produce an inductor current signal 1510 in proportion to the amount of current flowing through the output inductor 220. The inductor current detection arrangement 1505 includes a current sense amplifier 1515, a resistor $R_{CS}$ electrically connected between the positive input of the current sense amplifier 1515 and output inductor node 215, and a capacitor $C_{CS}$ electrically connected between the positive and negative inputs of the current sense amplifier 1515, with inductor node 220a also being connected to the negative input of the current sense amplifier 1515.

By connecting resistor $R_{CS}$ and capacitor $C_{CS}$ across the nodes 215, 220a of the output inductor 220, the current flowing through the output inductor 220 may be sensed in accordance with the following equation:

$$V_C(s) = V_L(s) \frac{1}{1+sR_{CS}C_{CS}} = i_L(s) \frac{R_L + sL}{1+sR_{CS}C_{CS}} \quad (3)$$

By selecting resistor $R_{CS}$ and capacitor $C_{CS}$ such that the time constant of resistor $R_{CS}$ and capacitor $C_{CS}$ equals the time constant of the output inductor 220 (i.e., inductance L/inductor DCR), the voltage across capacitor $C_{CS}$ is proportional to the current through the output inductor 220, and the inductor current detection arrangement 1505 may be treated as if only a sense resistor with a value of RL was used. A mismatch of time constants does not affect the measurement of the inductor DC current, but does affect the AC component of the current flowing through the output inductor 220.

Sensing the current flowing through the output inductor 220 may be advantageous with respect to high-side and/or low-side sensing, since the actual output current delivered to the load 135 may be obtained rather than a peak or sampled value of switch currents. Thus, the output voltage ($V_{OUT}$) may be positioned to meet a load line based on real time information. In this manner, a current sense circuit according to the present invention may advantageously support a single cycle transient response.

The current sense amplifier 1515 may be designed with a variable gain that decreases with decreasing temperature, and a nominal gain, for example, of 35 at 25 degrees Celsius and 31 at 125 degrees Celsius. This correlation of gain with temperature may compensate for a ppm/Degrees Celsius increase in the DCR of the output inductor 220.

The current sense amplifier 1515 communicates the current difference signal 1510 to a current comparator 1520, which compares the current signal 1510 to the average inductor current 1045 of all phases to produce the current difference signal 1050 for communication to the charge-on duration arrangement 1010.

Current average resistor 1525 is provided between the current signal 1510 and the average inductor current signal 1045. Since each of the phase output arrangements 110a, 110b, 110c, ..., 110n provides a similar current average resistor between their respective current signals and the average inductor current signal 1045, the average inductor current signal 1045 exhibits a voltage in proportion to the average of the respective current signals of the phase output arrangements 110a, 110b, 110c, ..., 110n.

Figure 16:
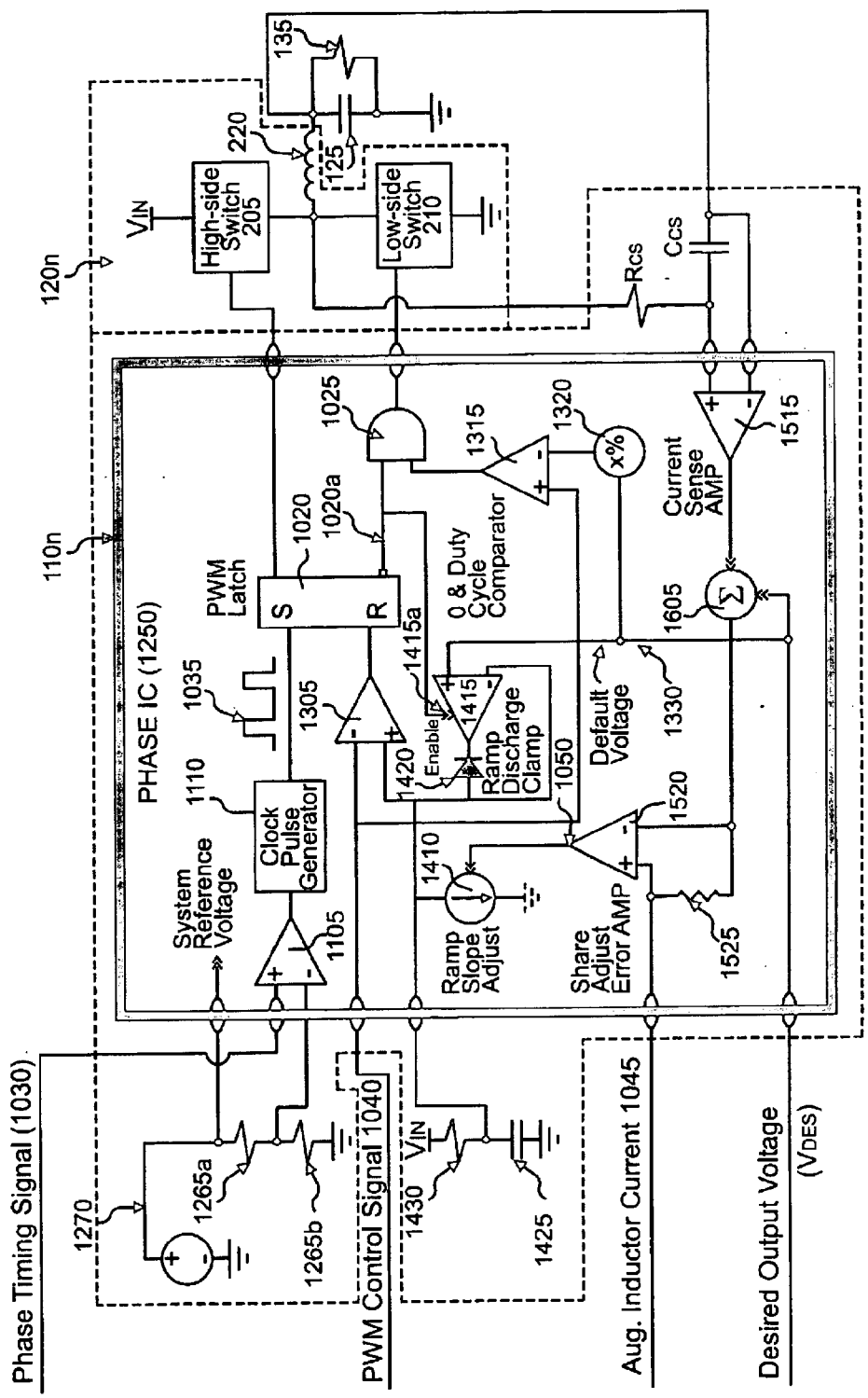
FIG. 16 is a block diagram showing an exemplary phase output arrangement according to the present invention implemented as a separate integrated circuit.

Referring now to FIG. 16, there is seen an exemplary phase output arrangement 110n and output switch arrangement 120n according to the present invention. As shown in FIG. 16, like components are labeled with the same reference characters as used in FIGS. 10 to 15. Additionally, the exemplary phase output arrangement 110n of FIG. 16 provides a summation arrangement 1605 for adding the desired output voltage ($V_{DES}$) level to the sensed current signal, so that the default ramp voltage may be set to the desired output voltage ($V_{DES}$) level.

Figure 3:
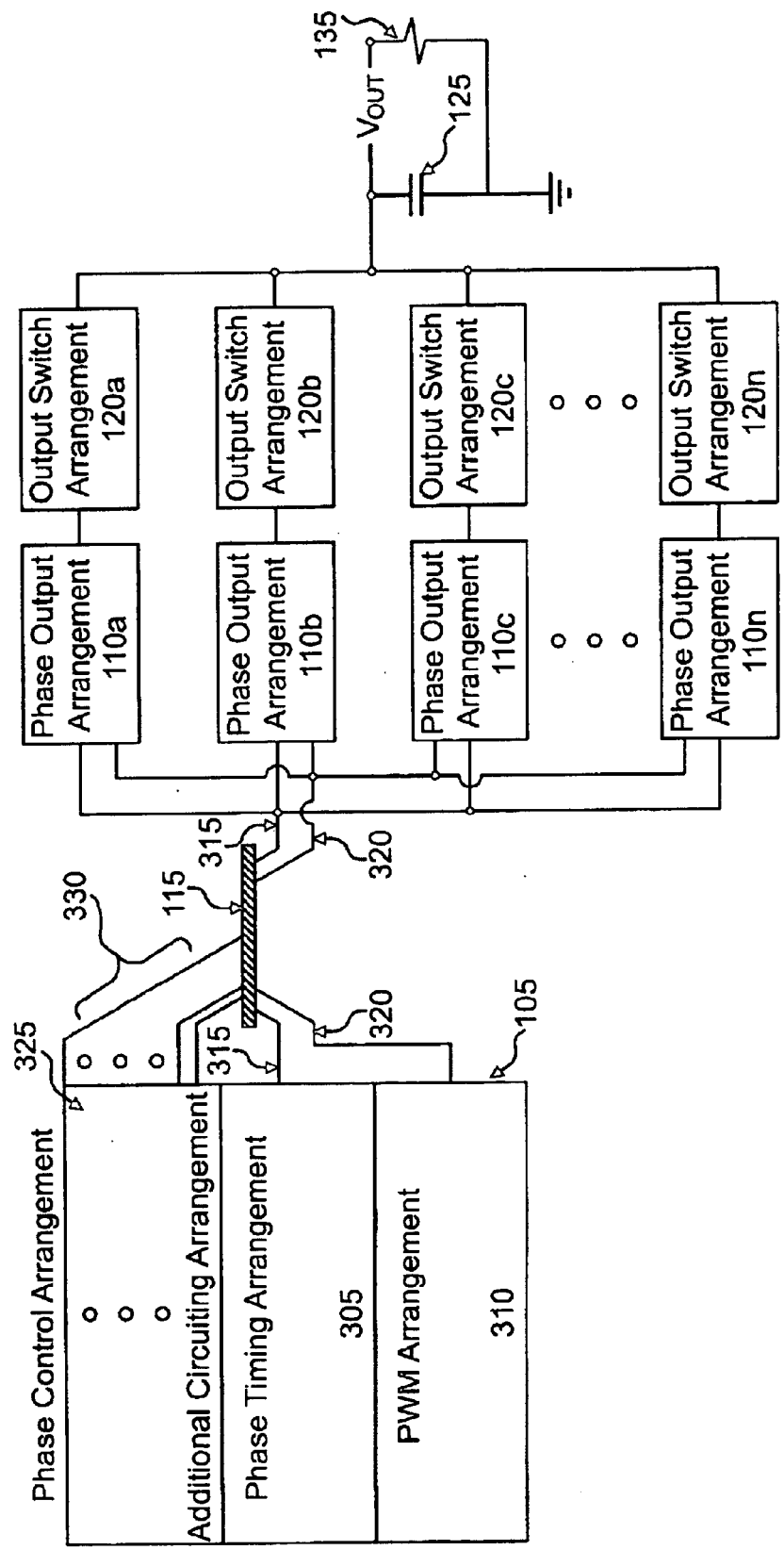
FIG. 3 is a block diagram showing the phase control arrangement of FIG. 1 in greater detail.

Referring now to FIG. 3, there is seen the exemplary multi-phase buck converter 100 of FIG. 1, in which the phase control arrangement 105 includes a phase timing arrangement 305 and a Pulse Width Modulation (PWM) arrangement 310 for generating the phase timing signal 1030 and the PWM control signal 1040, respectively, via phase control bus 115 (e.g., a 5-wire analog bus). Phase control arrangement 105 also includes additional circuitry arrangement 325 for generating additional control signals 330, which are not necessary for an understanding of the present invention.

Phase timing signal 1030 contains information to permit each of the phase output arrangements 110a, 110b, 110c, ..., 110n to determine its respective periodic start time 910, at which it may operate its respective one of the switch arrangements 120a, 120b, 120c, ..., 120n to provide current to the load 135. According to one exemplary embodiment of the present invention, the phase timing signal 1030 consists of a periodic voltage waveform, which is then decoded by the phase output arrangements 110a, 110b, 110c, ..., 110n, in a manner more fully described above.

Figure 5:
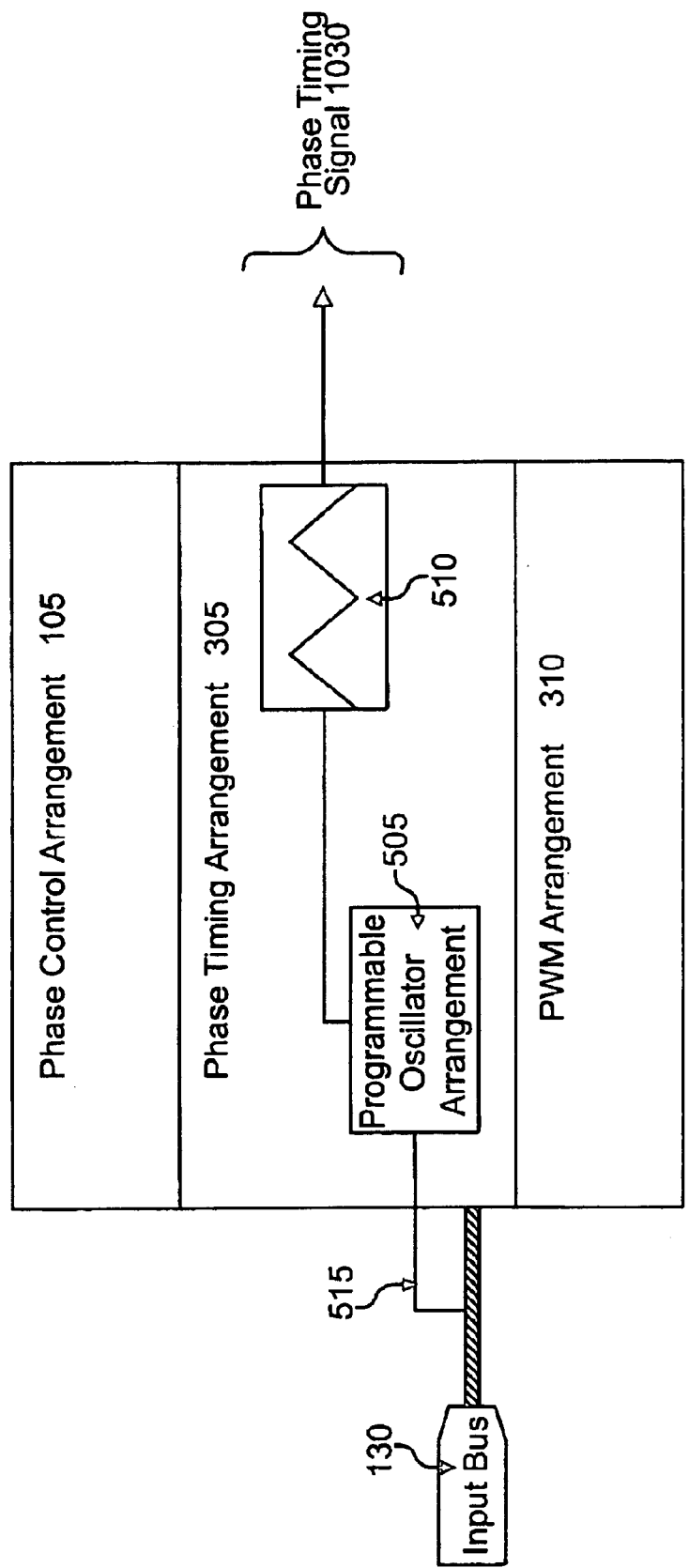
FIG. 5 is a block diagram showing the phase timing arrangement of FIG. 3 in greater detail.

Referring now to FIG. 5, there is seen an exemplary phase timing arrangement 305 according to the present invention for generating the periodic phase timing signal 1030. Phase timing arrangement 305 includes a programmable oscillator arrangement 505 electrically coupled to a periodic waveform generator 510, for example, a periodic triangular waveform generator 510. The periodic triangular waveform generator 510 is configured to generate the phase timing signal 1030 in accordance with the frequency of the programmable oscillator arrangement 505, which may be varied by a frequency select input 515 of the input bus 130 or, alternatively, may be programmed by an external frequency select resistor (not shown). In this manner, the frequency of the programmable oscillator arrangement 505 and, thus, the frequency of the periodic phase timing signal 1030, may be set to any desired frequency, for example, a frequency in the range of 100 KHz to 1 MHz.

Referring back to FIG. 3, the PWM arrangement 310 of the phase control arrangement 105 is configured to generate the PWM control signal 1040 containing information and/or data to permit the phase output arrangements 110*a*, 110*b*, 110*c*, . . . , 110*n* to determine a switch-on duration 915 for the high-side switch 205 of a respective one of the switch arrangements 120*a*, 120*b*, 120*c*, . . . , 120*n*. As described above, the longer the switch-on duration 915 for the high-side switch 205, the more current flows through the output inductor 220 of the respective switch arrangement. In this manner, the switch on duration 915 may be dynamically controlled to compensate for changes in load current, transient load conditions, and/or a change in the desired output voltage variable ($V_{DES}$).

Figure 6:
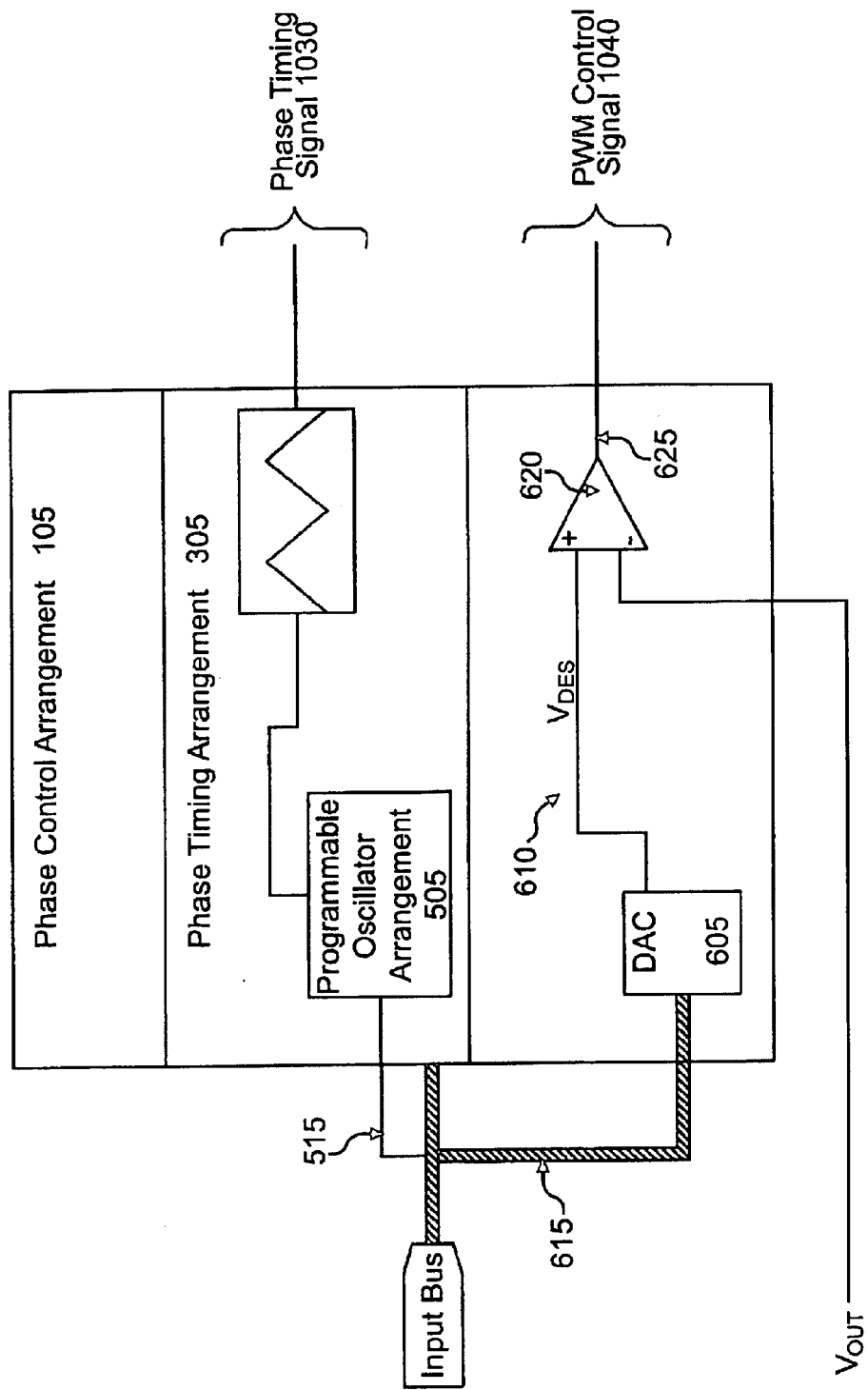
FIG. 6 is a block diagram showing the PWM arrangement of FIG. 3 in greater detail.

Referring now to FIG. 6, there is seen an exemplary PWM arrangement 310 according to the present invention for generating the PWM control signal 1040. As shown in FIG. 6, PWM arrangement 310 includes a digital-to-analog converter (DAC) 605 configured to produce the desired output voltage variable ($V_{DES}$) 610 from digital inputs 615 of the input bus 130. High-gain error amplifier 620 compares the desired output voltage variable ($V_{DES}$) 610 with the actual output voltage ($V_{OUT}$), and generates an error signal 625 proportional to the difference between the desired output voltage variable ($V_{DES}$) 610 and the actual output voltage ($V_{OUT}$). The error signal 625 may be communicated to the phase control bus 115 as the PWM control signal 1040.

Since the PWM arrangement 310 of FIG. 6 generates a PWM control signal 320 in proportion to the difference between the desired output voltage variable ($V_{DES}$) 610 and the actual output voltage ($V_{OUT}$), the PWM control signal 320 may be used by the phase output arrangements 110*a*, 110*b*, 110*c*, . . . , 110*n* to keep the actual output voltage ($V_{OUT}$) at the desired output voltage ($V_{DES}$). In this manner, the PWM arrangement 310 and the phase output arrangements 110*a*, 110*b*, 110*c*, . . . , 110*n* form a closed loop for controlling the actual output voltage ($V_{OUT}$) irrespective of changes in load current.

For example, if the actual output voltage ($V_{OUT}$) drops below the desired output voltage ($V_{DES}$) in response to an increase in load current, the switch-on duration 915 of the high-side switch 205 of a respective switch arrangement may be increased proportionally to the PWM control signal 1040, thereby causing the output inductor 220 of the respective switch arrangement to supply more current to the output capacitor 125, which, in turn, causes the output voltage ($V_{OUT}$) to rise. Alternatively, if the actual output voltage ($V_{OUT}$) rises above the desired output voltage ($V_{DES}$) in response to a decrease in load current, the switch-on duration of the high-side switch 205 of a respective switch arrangement may be decreased proportionally to the PWM control signal 320, thereby causing the output inductor 220 of the respective switch arrangement to supply less current to the output capacitor 125, which, in turn, causes the output voltage ($V_{OUT}$) to drop.

The digital inputs 615 of the DAC 605 may include, for example, a plurality of Voltage-Identification (VID) digital signals generated by an external circuit, for example, a mobile Intel Pentium IV microprocessor. Voltage-Identification (VID) signals may be generated by the microprocessor to communicate the voltage at which the processor core should operate. In this manner, the digital-to-analog converter (DAC) 605 of the PWM arrangement 310 may generate the desired output voltage variable ($V_{DES}$) in accordance with the proper processor core voltage.

Under certain circumstances, a request for a new desired output voltage ($V_{DES}$) may cause the digital inputs 615 (e.g., the VID inputs) to change during normal operation of the buck converter 100. When the phase control arrangement 105 detects a change in the Voltage-Identification (VID) code, the phase control arrangement 105 may, for example, blank the signals for a time duration, for example, 400 ns, to ensure that the detected change is not due to skew or noise.

In response to a request for a higher desired output voltage ($V_{DES}$), the high-gain error amplifier 620 (via the PWM control signal 1040) causes the charge-on duration of the phase output arrangements 110*a*, 110*b*, 110*c*, . . . , 110*n* to increase. Alternatively, in response to a request for a lower desired output voltage ($V_{DES}$), the high-gain error amplifier 620 causes the charge-on duration of the phase output arrangements 110*a*, 110*b*, 110*c*, . . . , 110*n* to decrease. However, as described above, a request for a lower desired output voltage ($V_{DES}$) may cause disadvantageous negative currents to flow through the output inductor 220.

Figure 8:
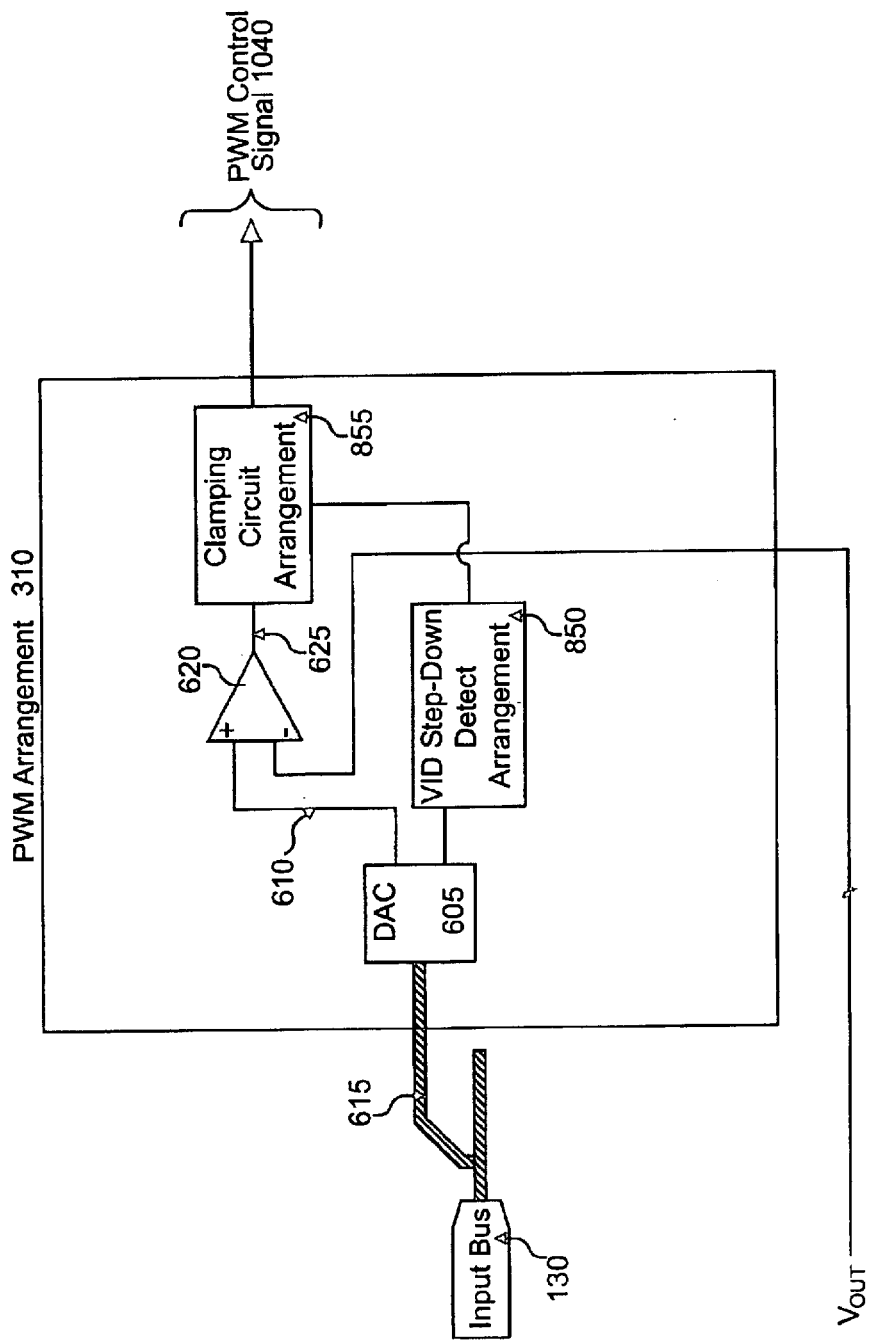
FIG. 8 is a block diagram showing another exemplary phase control arrangement according to the present invention.

Therefore, in accordance with another exemplary embodiment of the present invention, the phase control arrangement 105 is configured to switch off the high-side and low-side switches 205, 210 of each of the output switch arrangements 120*a*, 120*b*, 120*c*, . . . , 120*n* in response to a request for a lower desired output voltage ($V_{DES}$). For this purpose, the PWM arrangement 310 may be provided with a step-down detect arrangement 850, as shown in FIG. 8.

The step-down detect arrangement 850 detects a VID step-down condition to prevent the negative inductor currents described above (i.e., the negative inductor currents associated with a request for a lower desired voltage). For this purpose, PWM arrangement 310 includes a clamping circuit arrangement 855 configured to clamp the output of the high-gain error amplifier 820 to a voltage level lower than the default voltage of the ramp generator 1310 of each of the phase output arrangements 110*a*, 110*b*, 110*c*, . . . , 110*n*. In this manner, the PWM control signal 1040 generated by the PWM arrangement 310 causes the charge-on duration arrangement 1010 of each of the phase output arrangements 110*a*, 110*b*, 110*c*, . . . , 110*n* to switch off the high-side and low-side switches 205, 210 of the respective output switch arrangements 120*a*, 120*b*, 120*c*, . . . , 120*n*, until the output voltage ($V_{OUT}$) drops to approximately the lower output voltage ($V_{DES}$).

In certain circumstances, adaptive voltage positioning may be required to reduce output voltage deviations during load transients and the power dissipation when the load 135 is drawing maximum current. For this purpose, the PWM arrangement 310 may include droop circuitry configured to reduce the actual output voltage ($V_{OUT}$) proportionally to an increase in load current.

Figure 7:
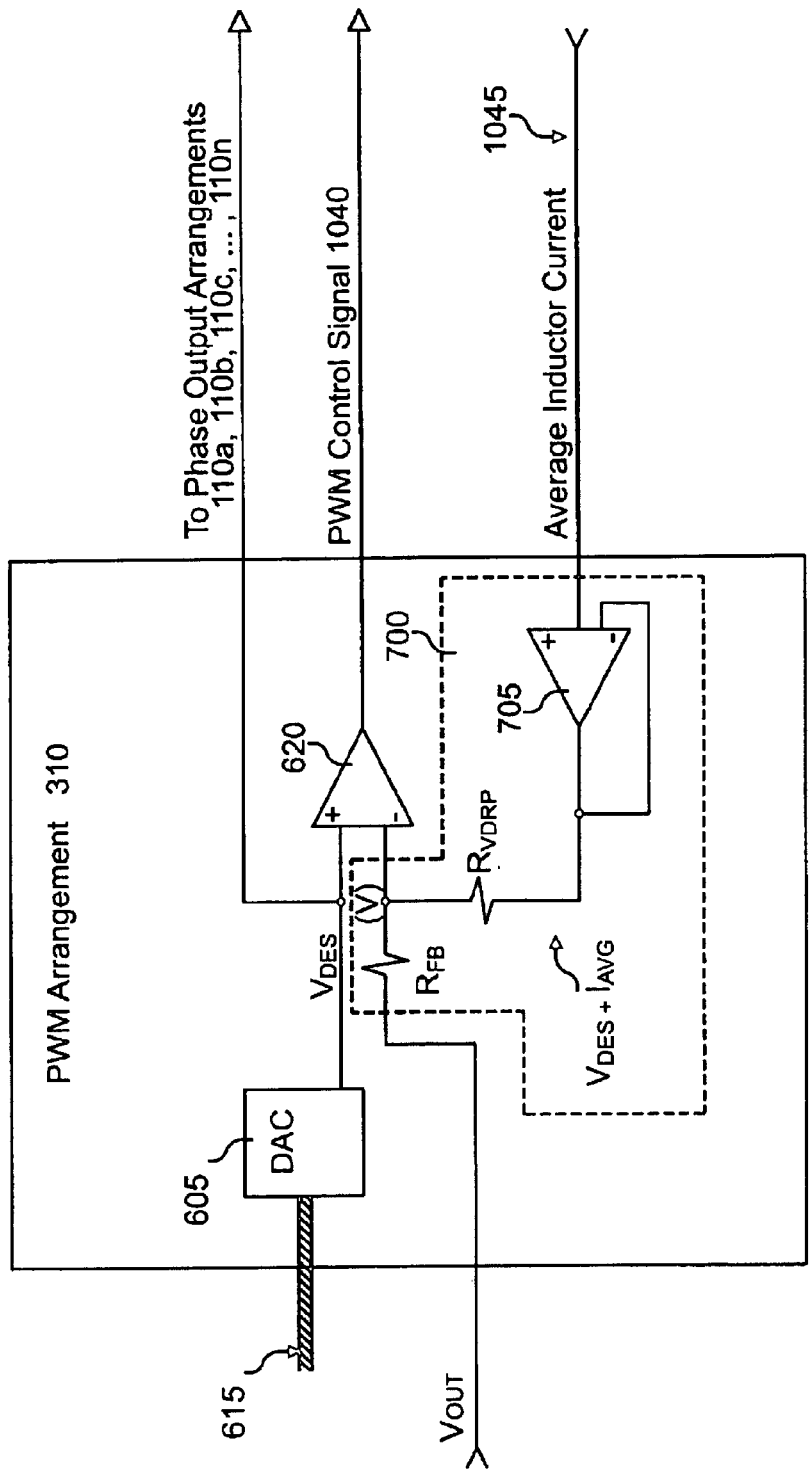
FIG. 7 is a block diagram showing a variant of the exemplary PWM arrangement of FIG. 6 configured to reduce the output voltage proportionally to an increase in load current.

Referring now to FIG. 7, there is seen a variant of the exemplary PWM arrangement 310 of FIG. 6 configured to reduce the output voltage ($V_{OUT}$) proportionally to an increase in load current. As shown in FIG. 7, the exemplary PWM arrangement 310 further includes droop circuitry 700, which includes a current signal buffer electrically connected to the average inductor current signal 1045. In this exemplary embodiment of the present invention, the average inductor current signal 1045 is referenced to the desired output voltage variable ($V_{DES}$), so that the output of the current signal buffer 705 is equal to ($V_{DES}+I_{AVG}$), where $I_{AVG}$ is proportional to the average current provided by the output inductors 220 of the output switch arrangements 120a, 120b, 120c, . . . , 120n. A droop resistor $R_{VDRP}$ is provided between the output of the current signal buffer 705 and the negative input of the high-gain error amplifier 620, and an offset resistor $R_{FB}$ is provided between the actual output voltage ($V_{OUT}$) and the negative input of the high-gain error amplifier 620.

Thus, the voltage (v) at the negative input of the high-gain error amplifier 620 is given by the following equation:

$$v = (V_{DES} + I_{AVG})\frac{R_{FB}}{R_{FB} + R_{VDRP}} + V_{OUT}\frac{R_{VDRP}}{R_{FB} + R_{VDRP}} \quad (4)$$

However, since the high-gain error amplifier 620 controls the voltage loop to keep its positive and negative inputs equal, the high-gain error amplifier 620 operates to keep the voltage at its negative input equal to the desired output voltage ($V_{DES}$). Thus, the actual voltage ($V_{OUT}$) can be determined from the following equation:

$$V_{OUT} = V_{DES} - I_{AVG}\frac{R_{FB}}{R_{VDRP}} \quad (5)$$

Thus, the exemplary PWM arrangement 310 of FIG. 6 operates to reduce the actual output voltage ($V_{OUT}$) proportionally to the average current provided by the output inductors 220 of the output switch arrangements 120a, 120b, 120c, . . . , 120n. The positioning voltage (v) may be programmed by selecting an appropriate droop resistor $R_{VDRP}$, so that the droop impendence produces the desired converter output impendence.

Figure 17:
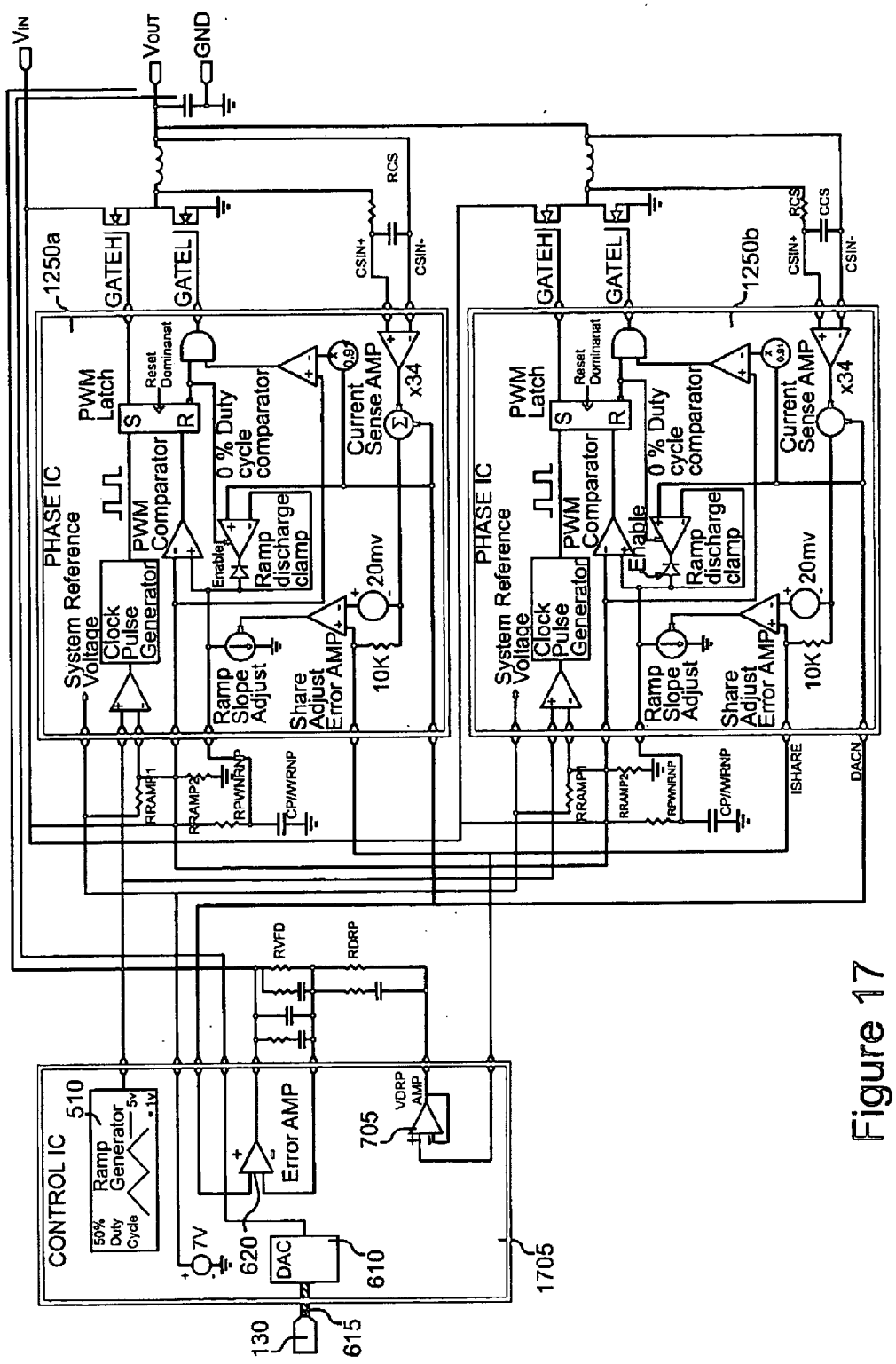
FIG. 17 is a block diagram showing the connectivity between a phase control arrangement and a plurality of phase output arrangements according to the present invention.

Referring now to FIG. 17, there is seen the exemplary buck converter 100 implemented using discrete control and phase ICs. The exemplary buck converter 100 of FIG. 17 includes a control IC 1705 containing all the functions of the phase control arrangement 105 and two phase ICs 1250a, 1250b (see FIG. 16) containing all functions of the phase output arrangements 110a, 110b, respectively.

Figure 18:
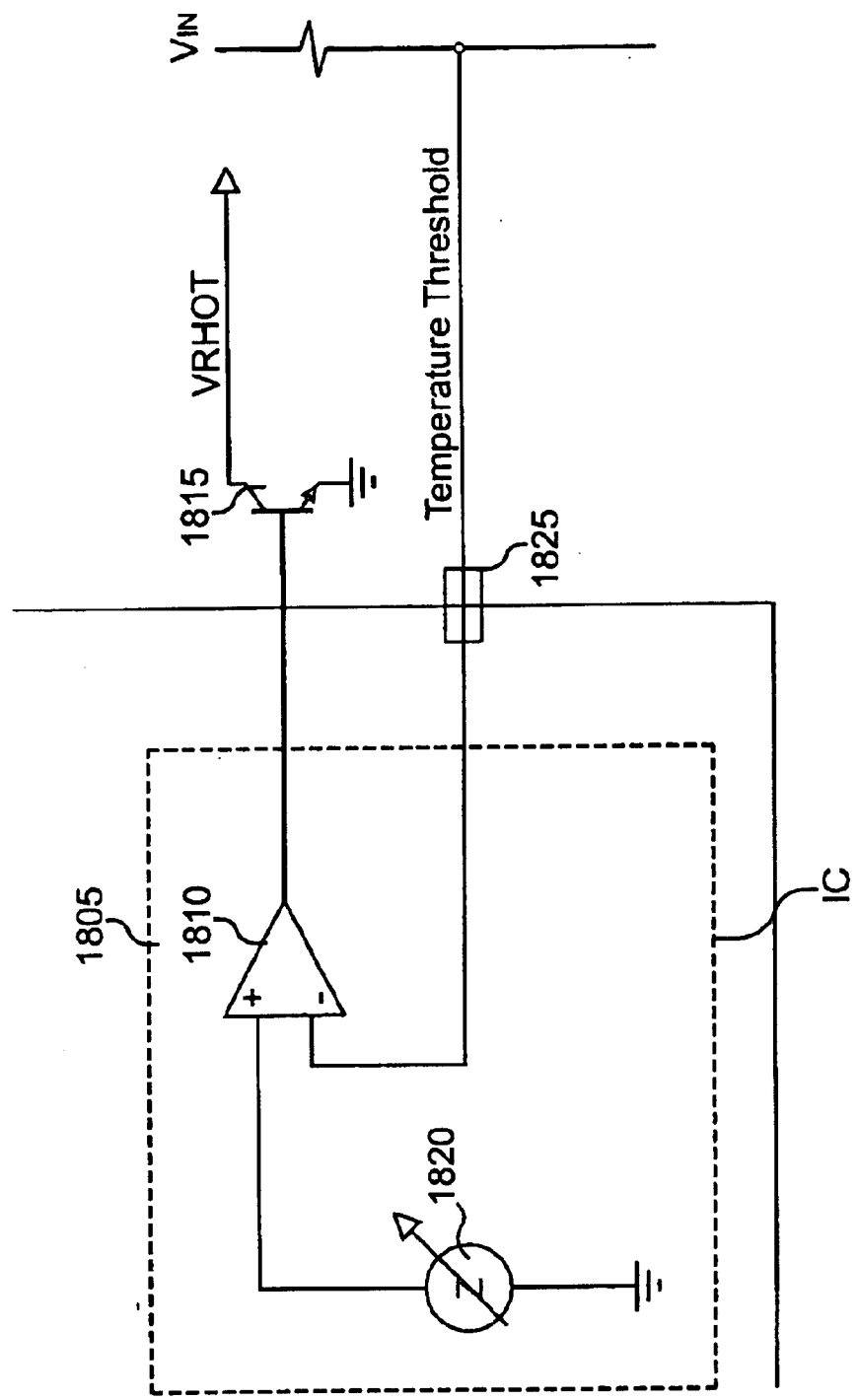
FIG. 18 is a block diagram showing an exemplary over-temperature detect circuit according to the present invention.
Figure 19:
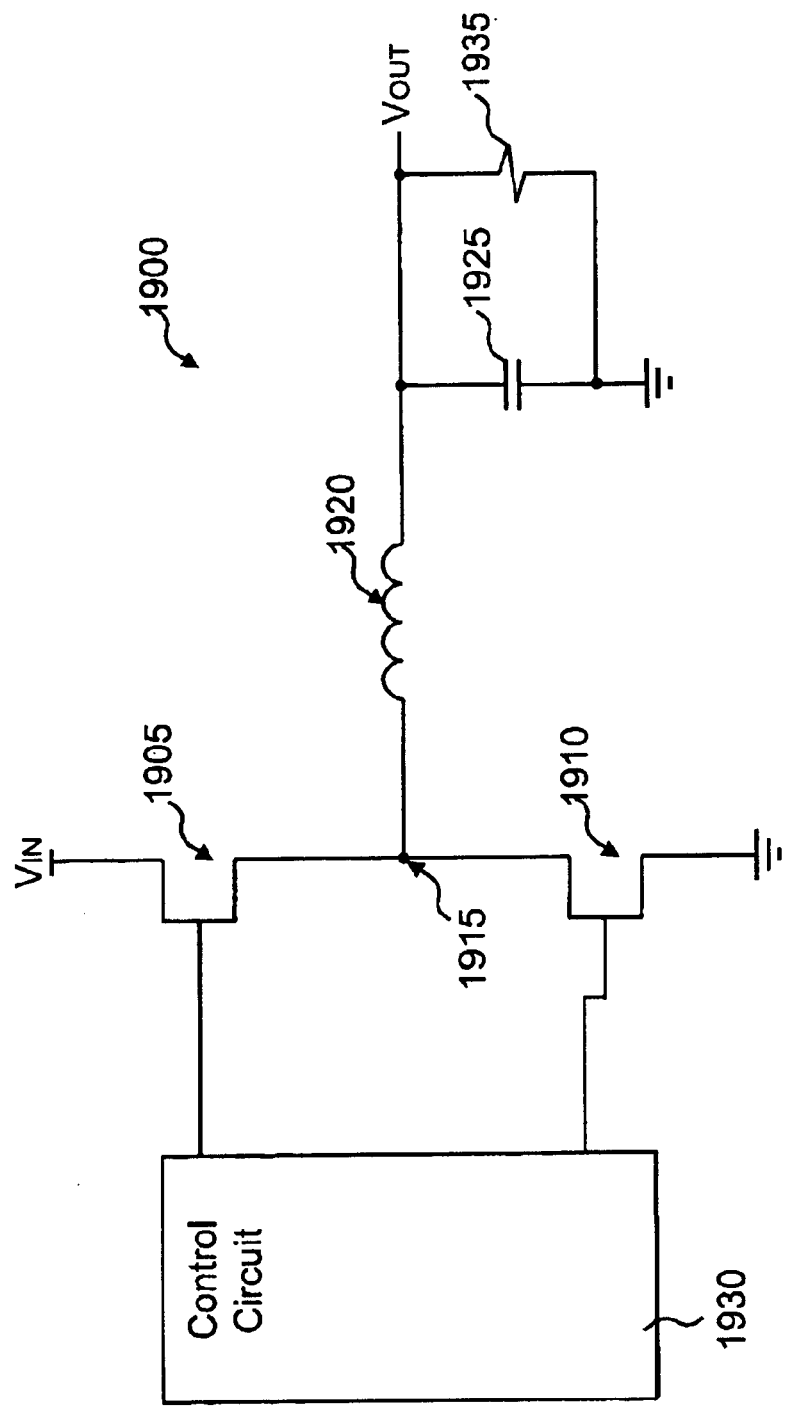
FIG. 19 is a block diagram showing a single phase buck converter according to the prior art.
Figure 20:
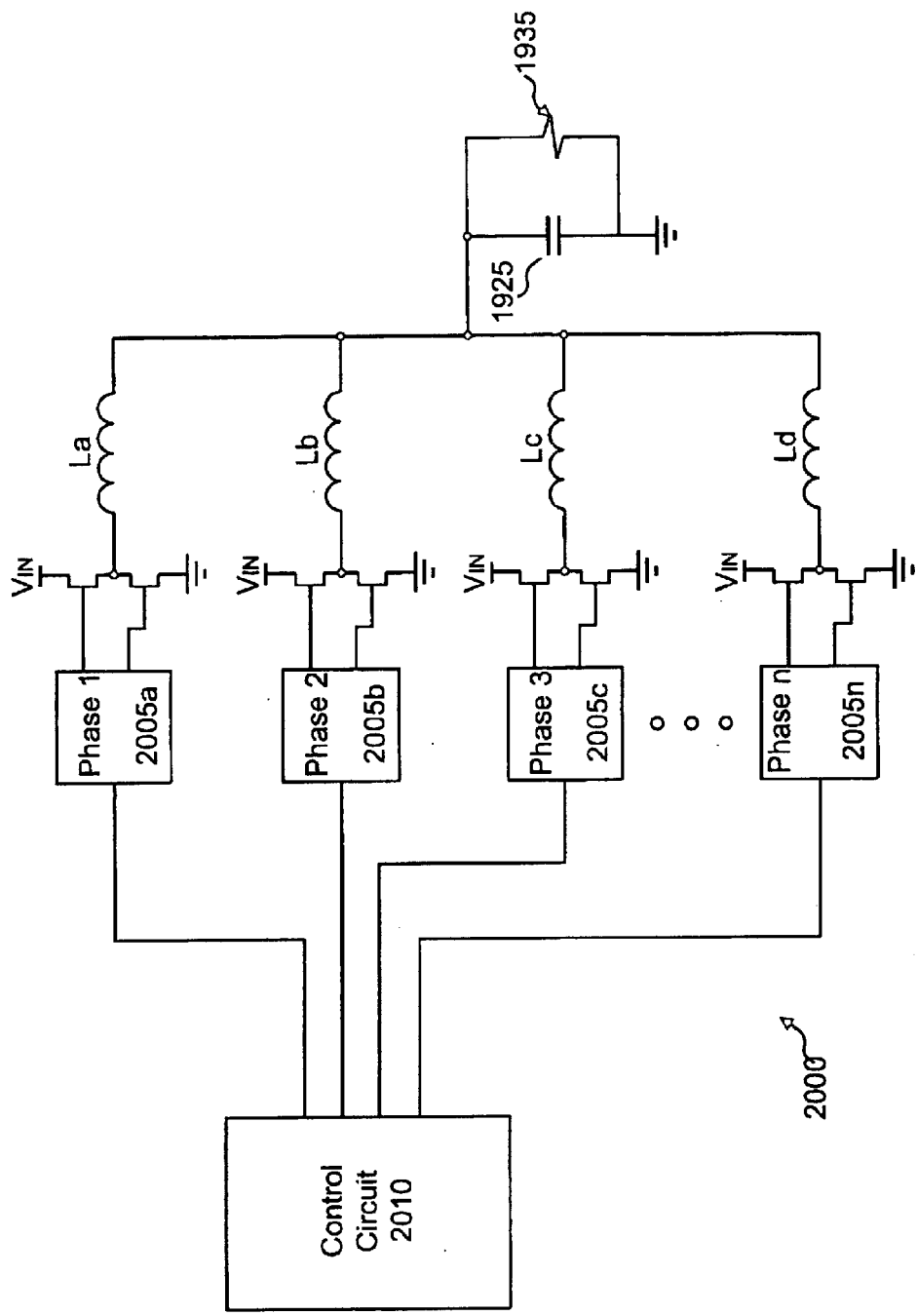
FIG. 20 is a block diagram showing a multi-phase buck converter according to the prior art.

Each of the control and phase ICs 1705, 1250a, 1250b may include an over-temperature detect circuit 1805, as shown in FIG. 18. Over-temperature detect circuit 1805 includes a VRHOT comparator 1810, a switch 1815 electrically connected to the output of the VRHOT comparator 1810, and a temperature sensing arrangement 1820 configured to produce a voltage proportional to the die temperature. Using an external pin 1825, the temperature threshold may be set using, for example, a voltage divider connected to $V_{IN}$. If the temperature of the die rises above the temperature threshold, the VRHOT comparator 1810 switches on the switch 1815, thereby causing a VRHOT signal 1830 to be generated. The VRHOT signal may be used, for example, to deactivate the phase or enable additional phases to share in the current production burden.

The number of phase output arrangements 110a, 110b, 110c, . . . , 110n chosen for a particular design may depend upon the need to meet thermal requirements and/or to minimize the number of input and output capacitors at maximum output current. However, at times when the output current of the buck converter 100 is less than the maximum output current, efficiency will increase if less phase output arrangements 110a, 110b, 110c, . . . , 110n are employed. Turning off phase output arrangements 110a, 110b, 110c, . . . , 110n as the output current decreases, increases efficiency by eliminating the gate charging loses, MOSFET switching losses, and circulating currents in high-side and low-side switches 205, 210, and the output inductors of each phase output arrangement 110a, 110b, 110c, . . . , 110n. Each unique circuit design should turn off phase output arrangements 110a, 110b, 110c, . . . , 110n in sequence at particular output current levels to achieve the maximum efficiency over the entire output current range.

Figure 21:
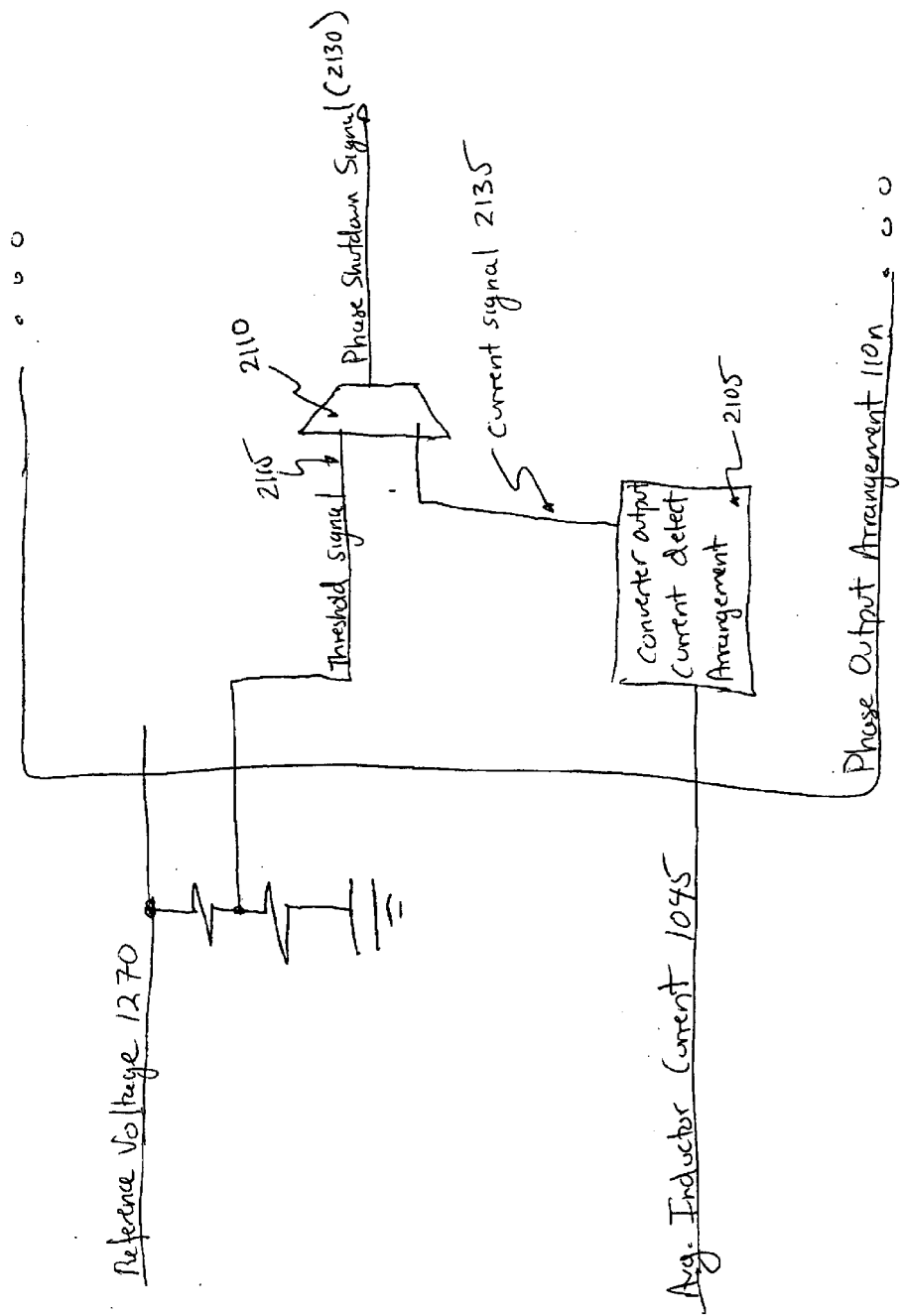
FIG. 21 is a block diagram of a phase output arrangement employing phase shutdown circuitry according to the present invention.

Referring now to FIG. 21, there is seen another exemplary embodiment of the present invention, in which each of the phase output arrangements 110a, 110b, 110c, . . . , 110n are operable to shutdown an assigned phase in accordance with the output current of the multi-phase buck converter 100. For this purpose, phase output arrangement 110n includes a converter output current detect arrangement 2105 operable to generate a current signal 2135 representing the current of the multi-phase buck converter 100 in accordance with average inductor current signal 1045, and a phase shutdown comparator 2130 electrically coupled to current signal 2135 and to a threshold signal 2115.

Phase output arrangement 110n may be "programmed" by providing a particular threshold signal value 2115 in accordance with the needs of a particular application. For example, in the exemplary embodiment of FIG. 21, threshold signal 2115 is provided by a pair of resistors 2120, 2125 coupled to one another in series between reference voltage 1270 and ground. In this manner, threshold signal 2115 may be provided by employing a simply selecting the appropriate resistor values of a voltage divider. However, it should be appreciated that the threshold signal 2115 may be provided in another manners, for example, by a digital-to-analog converter operable to convert a digital representation of the desired threshold signal 2115 into an analog threshold signal 2115, which may be provided to phase shutdown comparator 2130.

In operation, phase shutdown comparator 2130 compares the current signal 2135 to threshold signal 2115 and generates a phase shutdown signal 2130 if current signal 2135 drops below threshold signal 2115. Shutdown signal 2130 causes phase output arrangement 110n to turn off both the hide-side and low-side switches 205, 210 (e.g., MOSFETs) of the respectively assigned output switch arrangement 120n, which causes the output current of the multi-phase buck converter to decay. This, in turn, causes the output voltage of the multi-phase buck converter to sag, thereby causing phase control arrangement 105 to compensate by increasing the duty cycle of the remaining phase output arrangements 110a, 110b, 110c, . . . , 110n-1 in a manner more fully described above. This compensation does not cause the average inductor current signal 1045 to vary, as this signal 1045 represents the output current of the buck converter 100 itself, not the output currents of the individual phase output arrangements 110a, 110b, 110c, . . . , 110n.

Figure 22:
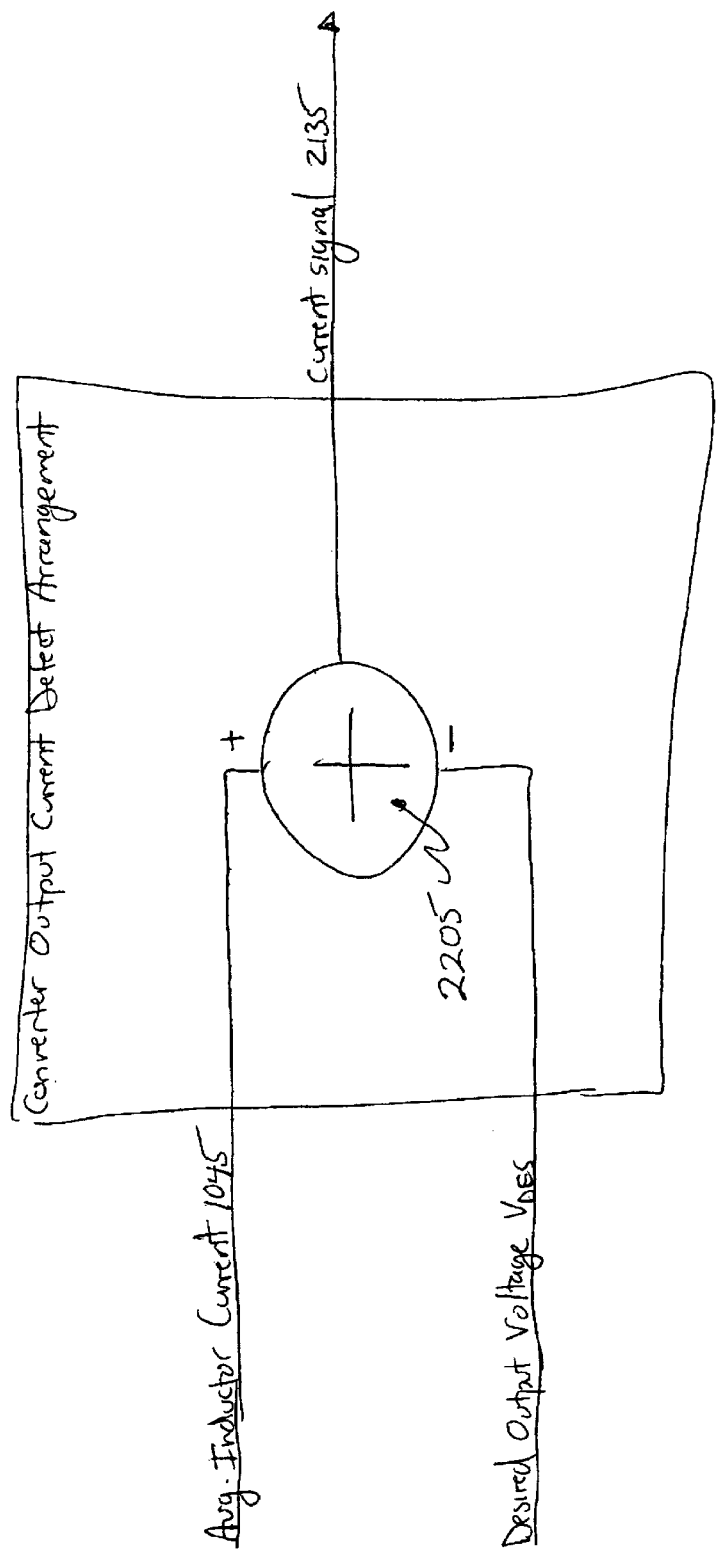
FIG. 22 is a block diagram of an exemplary converter output current detect arrangement according to the present invention.

Referring now to FIG. 22, there is seen an exemplary converter output detect arrangement 2105 according to the present invention. As shown in FIG. 22, converter output detect arrangement 2105 includes an adder unit 2205 which is electrically coupled to average inductor current signal 1045 and to desired output voltage signal $V_{DES}$. In operation, adder unit 2205 subtracts desired output voltage signal $V_{DES}$ from average inductor current signal 1045 to produce current signal 2135.

It should be appreciated that, although the phase shutdown circuitry is described above with respect to an exemplary multi-phase buck converter having modular phase output arrangements 110a, 110b, 110c, . . . , 110n, the phase shutdown circuitry may be employed in multi-phase buck converters having a fixed number of phase output arrangements or phases (e.g., two phases, three phases, four phases, eight phases).

What is claimed is:

1. A buck converter for providing an output voltage to a load, the output voltage being produced from an input voltage in accordance with a desired voltage, the buck converter comprising:
an output capacitor, the output voltage being provided by the output capacitor;
a plurality of output switch arrangements having respective output inductors coupled to the output capacitor, the switch arrangements being controllable to provide respective phase output currents to the output capacitor through the respective output inductors;
a plurality of phase output arrangements respectively coupled to the output switch arrangements, the phase output arrangements being controllable to set the respective phase output currents supplied by the output switch arrangements, each of the phase output arrangements being operable to shutdown the respective output switch arrangement if a signal representing an output current of the buck converter falls below a respective programmable threshold signal; and
a phase control arrangement configured to control the phase output arrangements to set the respective phase output currents supplied by the output switch arrangements so that the output voltage approximates the desired voltage.

2. The buck converter according to claim 1, wherein each of the output switch arrangements includes a high-side switch and a low-side switch coupled to the high-side switch via a respective switch node, the output inductor of each of the output switch arrangements being coupled to the respective switch node.

3. The buck converter according to claim 2, further comprising a phase control bus via which the phase control arrangement controls the phase output arrangements, the phase control bus including a phase timing signal, a PWM control signal, and an average inductor current signal, each of the phase output arrangements includes a start-time arrangement configured to switch on the high-side switch of the respective output switch arrangement in accordance with the phase timing signal, each of the phase output arrangements includes a charge-on duration arrangement configured to switch off the high-side switch of the respective output switch arrangement in accordance with the PWM control signal.

4. The buck converter according to claim 3, wherein the start-time arrangement includes a phase timing comparator electrically coupled to the phase timing signal and a one-shot pulse generator electrically coupled to an output of the phase timing comparator, the one-shot pulse generator configured to produce a clock pulse in accordance with the phase timing signal and a set-point voltage, the clock pulse switching on the high-side switch.

5. The buck converter according to claim 4, wherein the set-point voltage is provided by a voltage divider connected between a reference voltage and a ground voltage.

6. The buck converter according to claim 3, wherein the charge-on duration arrangement includes a ramp generator electrically coupled to the current difference signal and a charge-on duration amplifier electrically coupled to the ramp generator and the PWM control signal, the ramp generator being configured to produce a ramp output signal in accordance with the current difference signal and a default voltage, the charge-on duration amplifier configured to switch off the high-side switch in accordance with the ramp output signal and the PWM control signal.

7. The buck converter according to claim 6, wherein the ramp generator includes a ramp capacitor electrically coupled to the ramp output signal, a clamp circuit electrically coupled to the ramp output signal and to the default voltage, and a programmable current source electrically coupled between the ramp output signal and a ground voltage, the programmable current source being controllable in accordance with the current difference signal.

8. The buck converter according to claim 7, wherein the phase control bus includes a signal characterizing the desired voltage, each of the phase output arrangements receiving the signal characterizing the desired voltage, the default voltage being set in accordance with the signal characterizing the desired voltage.

9. The buck converter according to claim 7, wherein the ramp generator further includes a phase error detect arrangement configured to produce a phase error signal if the phase output arrangement is incapable of providing a phase output current to match the average inductor current signal.

10. The buck converter according to claim 6, wherein the charge-on duration arrangement further includes a body-brake detect amplifier configured to switch off the high-side switch and the low-side switch in response to at least one of a request for a lower desired voltage and a decrease in a current demand of the load.

11. The buck converter according to claim 10, wherein the request for the lower desired voltage and the decrease in the current demand of the load are determined in accordance with the PWM control signal.

12. The buck converter according to claim 3, wherein each of the phase output arrangements further includes a current sense arrangement electrically connected to a first node and a second node of the respective output inductor and to the average inductor current signal, the current sense arrangement configured to detect the respective phase output current and to generate a current difference signal in accordance with the average inductor current signal and the respective phase output current.

13. The buck converter according to claim 12, wherein the current sense arrangement includes a current detection arrangement connected to the first and second nodes of the respective output inductor and a current comparator electrically connected to an output of the current sense arrangement and to the average inductor current signal, the current sense arrangement generating the current difference signal in accordance with the output of the current sense arrangement and the average inductor current signal.

14. The buck converter according to claim 13, wherein the current detection arrangement includes a current sense amplifier, a resistor RCS electrically coupled between a positive input of the current sense amplifier and the first node, and a capacitor CCS electrically coupled between the positive input and a negative input of the current sense amplifier, the second node being connected to the negative input, a time constant of the resistor RCS and the capacitor CCS being approximately equal to a time constant of the respective output inductor.

15. The buck converter according to claim 3, wherein the phase control arrangement includes a phase timing arrangement and a PWM arrangement, the phase timing arrangement configured to produce the phase timing signal and the PWM arrangement configured to produce the PWM control signal.

16. The buck converter according to claim 15, wherein the phase timing arrangement includes a programmable oscillator arrangement and a periodic waveform generator electrically coupled to the programmable oscillator arrangement, a frequency of the programmable oscillator arrangement be selectable via a frequency select input, the periodic waveform generator producing the phase timing signal in accordance with the frequency of the programmable oscillator arrangement.

17. The buck converter according to claim 15, wherein the PWM arrangement includes a digital-to-analog converter configured to produce a variable characterizing the desired voltage in accordance with a plurality of digital VID signals, a high-gain error amplifier electrically coupled to the variable characterizing the desired voltage and the output voltage, the high-gain error amplifier producing the PWM control signal in accordance with the variable characterizing the desired voltage and the output voltage.

18. The buck converter according to claim 15, wherein the PWM arrangement further includes droop circuitry configured to modify the PWM control signal, such that the output voltage is reduced proportionally to an increase in a current flow through the load.

19. The buck converter according to claim 15, wherein the PWM arrangement further includes body-brake circuitry configured to modify the PWM control signal, such that the phase output arrangements switch off the high-side and low-side switches of the respective output switch arrangements in response to a request for a lower desired output voltage.

20. The buck converter according to claim 3, wherein each of the phase control arrangement and the phase output arrangements includes a respective over-temperature detect circuit configured to produce a VRHOT signal if a temperature of the respective integrated circuit rises above a respective temperature threshold.

21. The buck converter according to claim 1, wherein the phase output arrangements include a fixed number of phase output arrangements.

22. A phase output arrangement of a buck converter, the phase output arrangement being electrically coupleable to an output switch arrangement having an output inductor, a high-side switch, and a low-side switch, the buck converter providing an output voltage to a load via an output capacitor electrically coupled to the output inductor, the output voltage being produced from an input voltage in accordance with a desired voltage, the phase output arrangement comprising: an arrangement configured to shutdown the high-side and low-side switches of the output switch arrangement if a signal representing an output current of the buck converter falls below a programable threshold signal.

23. A phase output arrangement of a buck converter, the phase output arrangement being electrically coupleable to an output switch arrangement having an output inductor, a high-side switch, and a low-side switch, the buck converter providing an output voltage to a load via an output capacitor electrically coupled to the output inductor, the output voltage being produced from an input voltage in accordance with a desired voltage, the phase output arrangement comprising:

an arrangement configured to shutdown the high-side and low-side switches of the output switch arrangement if a signal representing an output current of the buck converter falls below a programable threshold signal;

wherein the arrangement configured to shutdown the high-side and low-side switches of the output switch arrangement if the signal representing an output current of the buck converter falls below the programmable threshold signal includes:

a converter output current detect arrangement operable to generate the signal representing the output current of the buck converter; and a phase shutdown comparator electrically coupled to the signal representing the output current of the buck converter and to the programmable threshold signal, the phase shutdown comparator generating a shutdown signal for shutting down the high-side and low-side switches of the output switch arrangement if the signal representing the output current of the buck converter falls below the programmable threshold signal.

24. A phase output arrangement of a buck converter, the phase output arrangement being electrically coupleable to an output switch arrangement having an output inductor, a high-side switch, and a low-side switch, the buck converter providing an output voltage to a load via an output capacitor electrically coupled to the output inductor, the output voltage being produced from an input voltage in accordance with a desired voltage, the phase output arrangement comprising:

an arrangement configured to shutdown the high-side and low-side switches of the output switch arrangement if a signal representing an output current of the buck converter falls below a programable threshold signal;

wherein the programmable threshold signal is provided by an external circuit.

25. The phase output arrangement according to claim 24, wherein the external circuit includes a voltage divider.

26. The phase output arrangement according to claim 25, wherein the voltage divider includes at least two resistors connected to one another in series between a reference voltage and a ground voltage.

27. The phase output arrangement according to claim 24, wherein the external circuit includes an digital-to-analog converter operable to output the programmable threshold signal.

28. The buck converter according to claim 2, wherein each of the phase output arrangements is operable to shutdown the respective output switch arrangement by shutting down both the respective high-side and low-side switches.

* * * * *